United States Patent
Bevan et al.

(10) Patent No.: US 8,910,614 B2
(45) Date of Patent: Dec. 16, 2014

(54) SUPERCHARGER WITH CONTINUOUSLY VARIABLE DRIVE SYSTEM

(71) Applicant: Eaton Corporation, Cleveland, OH (US)

(72) Inventors: Karen E. Bevan, Northville, MI (US); Daniel Robert Ouwenga, Portage, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 14/154,429

(22) Filed: Jan. 14, 2014

(65) Prior Publication Data
US 2014/0123939 A1    May 8, 2014

Related U.S. Application Data

(63) Continuation-in-part of application No. 13/902,876, filed on May 27, 2013, now Pat. No. 8,763,586, which is a continuation of application No. 12/712,187, filed on Feb. 24, 2010, now Pat. No. 8,469,000.

(51) Int. Cl.
| | |
|---|---|
| F02D 9/08 | (2006.01) |
| F02B 33/00 | (2006.01) |
| F02M 25/07 | (2006.01) |
| F02D 41/00 | (2006.01) |
| F02D 23/00 | (2006.01) |
| F02B 39/04 | (2006.01) |

(52) U.S. Cl.
CPC ............ *F02B 39/04* (2013.01); *F02D 41/0007* (2013.01); *F02D 2200/101* (2013.01); *F02D 23/005* (2013.01); *Y02T 10/144* (2013.01)
USPC .................... 123/377; 123/559.1; 123/568.11

(58) Field of Classification Search
CPC .......... F02B 43/10; F02B 37/10; F02B 37/04; F02B 33/446; F02B 39/10; F02B 39/12; F02B 39/04; F02D 9/1095; F02D 2041/002; F02D 41/1441; F02D 11/10; F02D 31/005; F02D 9/00; F02M 3/062; F02M 25/0707; F02M 35/10013; F02M 25/0718; F01N 13/02; F01N 3/0842; F02C 7/26; B60W 10/06; F16H 59/32; F16H 61/12; F16H 61/6648
USPC .......... 123/336, 337, 559.1–559.3, 568.11, 3, 123/348, 564–566, 561, 41.11, 339.1, 123/339.23, 347; 60/274, 276, 278, 285, 60/287, 607–609; 477/30–34, 37, 43
See application file for complete search history.

(56) References Cited

U.S. PATENT DOCUMENTS

| | | |
|---|---|---|
| 3,270,730 A | 9/1966 | Seamus |
| 3,279,447 A | 10/1966 | Barnett et al. |

(Continued)

FOREIGN PATENT DOCUMENTS

| | | |
|---|---|---|
| GB | 1 005 350 | 9/1965 |
| GB | 2 230 816 | 10/1990 |

(Continued)

OTHER PUBLICATIONS

International Search Report for PCT/IB2011/000377 mailed Aug. 31, 2011, pp. 1-4.

(Continued)

*Primary Examiner* — John Kwon
*Assistant Examiner* — Johnny H Hoang
(74) *Attorney, Agent, or Firm* — Mei & Mark LLP

(57) ABSTRACT

A combustion system comprises a supercharger with an operating range from an idled condition up to a maximum rotations per minute (RPM) of its drive shaft. An engine in the system has an engine operating range from an idled condition up to a maximum RPM of its crank shaft, the engine having at least one airflow demand for each RPM in the engine operating range for providing peak torque output. A continuously variable transmission (CVT) is connected to the drive shaft for transmitting a variable amount of rotational energy to operate the supercharger. The control system controls the transmitting of the CVT based on the at least one airflow demand for each RPM in the engine operating range such that the supercharger variably pumps air across the operating range as the engine operates across the engine operating range.

21 Claims, 19 Drawing Sheets

(56) References Cited

U.S. PATENT DOCUMENTS

| | | |
|---|---|---|
| 4,426,985 A | 1/1984 | Kanesaka |
| 4,505,117 A | 3/1985 | Matsuoka |
| 4,514,991 A * | 5/1985 | Zinsmeyer .................. 62/209 |
| 4,519,373 A | 5/1985 | Hardy et al. |
| 4,563,997 A | 1/1986 | Aoki |
| 4,730,593 A | 3/1988 | Regar |
| 4,815,437 A | 3/1989 | Regar |
| 4,875,454 A | 10/1989 | Okimoto et al. |
| 4,996,966 A | 3/1991 | Hitomi et al. |
| 5,117,799 A | 6/1992 | Suzuki et al. |
| 5,205,191 A | 4/1993 | Takata et al. |
| 5,335,500 A | 8/1994 | Wunderlich et al. |
| 5,819,538 A | 10/1998 | Lawson, Jr. |
| 5,937,831 A | 8/1999 | Volkmann et al. |
| 6,050,094 A | 4/2000 | Udd et al. |
| 6,058,348 A | 5/2000 | Ohyama et al. |
| 6,273,076 B1 | 8/2001 | Beck et al. |
| 6,318,349 B1 | 11/2001 | Muto et al. |
| 6,343,473 B1 | 2/2002 | Kanesaka |
| 6,354,268 B1 | 3/2002 | Beck et al. |
| 6,474,323 B1 | 11/2002 | Beck et al. |
| 6,678,605 B2 | 1/2004 | Kisaka et al. |
| 6,681,574 B2 * | 1/2004 | Berglund et al. ............... 60/614 |
| 6,704,639 B2 | 3/2004 | Amano |
| 7,478,629 B2 | 1/2009 | de Valle Bravo et al. |
| 2002/0013653 A1 | 1/2002 | Ohyama et al. |
| 2004/0194759 A1 | 10/2004 | Yamaoka et al. |
| 2005/0074341 A1 | 4/2005 | Dairokuno et al. |
| 2005/0211231 A1 | 9/2005 | Kelley, Jr. |
| 2006/0254565 A1 | 11/2006 | Bottcher et al. |
| 2007/0079805 A1 | 4/2007 | Weber et al. |
| 2008/0256950 A1 | 10/2008 | Park |
| 2009/0291803 A1 | 11/2009 | Moeller |
| 2013/0017925 A1 | 1/2013 | Burtt |

FOREIGN PATENT DOCUMENTS

| | | |
|---|---|---|
| JP | 58-158320 | 9/1983 |
| JP | 62-55418 | 3/1987 |
| JP | 7-286526 | 10/1995 |
| JP | 2001-355501 | 12/2001 |
| JP | 2007-211634 | 8/2007 |

OTHER PUBLICATIONS

Written Opinion for PCT/IB2011/000377 mailed Aug. 31, 2011, pp. 1-4.

Chadwell: Christopher J., "CVT Supercharger and Hedge Enabled Efficient Downsizing for Spark Ignition Engines," Southwest Research Institute, San Antonio, TX, Oct. 7, 2009, p. 1-4.

"Torotrak previews first variable supercharger installation in a passenger car," Tototrak.com, Leyland, UK, posted Jul. 29, 2011, pp. 1-2.

"Variable drive supercharger testing progresses," Tototrak.com, Leyland, posted Jan. 18, 2012, pp. 1.

* cited by examiner

SUPERCHARGER WITH CONTINUOUSLY VARIABLE DRIVE SYSTEM

This application is a continuation in part of, and claims the benefit of priority of, U.S. Ser. No. 13/902,876 filed May 27, 2013, which is a continuation of U.S. Ser. No. 12/712,187, filed Feb. 24, 2010, now U.S. Pat. No. 8,469,000, all of which are incorporated herein by reference in their entirety.

TECHNICAL FIELD

The present disclosure relates generally to superchargers for supplying air to a combustion engine. A control strategy utilizes a continuously variable transmission in combination with a fixed capacity supercharger.

BACKGROUND

In general, the amount of air provided to a combustion engine is proportionally related to an amount of power that the engine can provide. The power can be supplied as rotational shaft energy to a variety of devices, including vehicles such as automobiles. The engine power is related to its output shaft rotations per minute (RPM) and the torque that shaft is providing. In order to have varying output powers at a given engine RPM, the output shaft torque must vary. The output shaft torque is a function of many variables, but it is largely related to the amount of air entering the engine.

An air boosting system allows the engine to consume more air, thus resulting in the ability to make more torque at the output shaft. One such boosting system is a supercharger, which is a positive displacement air pump that may comprise parallel lobed rotors or offset screw-type rotors. Another type of supercharger is a centrifugal supercharger with a central impeller. A supercharger may provide air or other gaseous matter to an internal combustion engine.

The supercharger may be combined with airflow valves to provide the exact amount of air required to the engine. Because superchargers are generally designed for a fixed volume of air, a bypass valve may also be included. The bypass valve is opened when the full amount of air flowing through the supercharger is not required by the engine. The excess air mass is then allowed to recirculate and enter the inlet of the supercharger again. Any excess air being recirculated still requires energy to pump, and thus decreases the overall efficiency of the boosting system.

Prior art systems have used fixed pulley designs having a pulley attached to a rotating crank shaft of an engine and to a rotational shaft of a supercharger. As engine RPMs increase, and thus the engine's demand for air, the fixed pulley allows the supercharger's rotors to spin faster to provide additional air. The pulley typically sets a fixed ratio between engine RPMs and the supercharger RPMs. While the fixed pulley system allows for the advantage of varying air supply, the air supplied is not always the optimal amount. In addition, the use of a fixed ratio results in a system where either the engine or the supercharger or both cannot be used to the full extent of its rated operational range, resulting in wasted capacity.

SUMMARY

In one embodiment, a combustion system may comprise a control system comprising a processor, a memory, an algorithm stored in the memory, and control electronics. A supercharger in the system may comprise an air inlet, an air outlet, and a drive shaft. The supercharger is configured to move air from the air inlet to the air outlet, with an operating range from an idled condition up to a maximum rotations per minute (RPM) of the drive shaft. An engine in the system may comprise combustion chambers configured to receive air from the outlet of the supercharger. The engine may further comprising an associated crank shaft. The engine has an engine operating range from an idled condition up to a maximum RPM of the crank shaft, the engine having at least one airflow demand for each RPM in the engine operating range for providing peak torque output. A continuously variable transmission (CVT) is connected to the control system and further connected to the drive shaft for transmitting a variable amount of rotational energy to operate the supercharger. The control system controls the transmitting of the CVT based on the at least one airflow demand for each RPM in the engine operating range such that the supercharger variably pumps air across the operating range as the engine operates across the engine operating range.

In addition, for a selected drive shaft RPM, the control system can select one of a plurality of airflow demands based on received operating conditions and can then control the torque transmitting of the CVT to provide rotational energy to the supercharger to move a quantity of air meeting the selected one of the plurality of airflow demands.

A computer program product may comprise a tangible storage medium and a program stored on the storage medium, the program, when executed by a processor connected to a vehicle control system. The program is configured for performing a method comprising receiving sensor data indicating operating conditions of a vehicle, receiving engine data indicating a rotations per minute (RPM) of a crank shaft of an engine of the vehicle, and processing the received sensor data and the received engine data to determine a control signal for controlling a continuously variable transmission (CVT) of the vehicle. The control signal is transmitted to the CVT. The CVT is connected to a drive shaft of a supercharger, the supercharger connected to move air to the engine such that the moved air equals engine airflow demand for outputting peak torque in response to the operating conditions. The method further adjusts the transmitted control signal as the received sensor data varies such that a crank shaft RPM corresponds to a plurality of different control signals to satisfy airflow demands based on variations in the operating conditions.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments and together with the description, serve to explain the principles of the invention.

DETAILED DESCRIPTION

Reference will now be made in detail to the present exemplary embodiments, examples of which are illustrated in the accompanying drawings. Wherever possible, the same reference numbers will be used throughout the drawings to refer to the same or like parts. Throughout the drawings, a line with a single arrow-head denotes an air pathway.

An example of a prior art air supply and engine system can include a supercharger in fluid communication with an engine. The prior art supercharger may comprise at least one lobed rotor and associated drive shaft for accelerating a volume of air. The drive shaft may be associated with a fixed ratio torque transfer system. The fixed ratio torque transfer system may occur via a variator or a pulley system, whereby a torque amount supplied to the drive shaft is fixedly preset for predetermined RPMs. Such a pulley system may comprise a first pulley connected to the drive shaft and a second pulley associated with a crank shaft of the engine. A tension belt may be arranged on the first pulley and the second pulley to allow the transfer of rotational power from the engine crank shaft to the drive shaft. One example of a ratio of rotational power transfer is 4:1, where every one turn of the engine crank shaft results in four turns of the drive shaft. This allows the supercharger to increase the volume of air transferred by the rotor each time the engine speed increases. Such a preset system is blind to other system changes during vehicle operation. The preset system is mechanically set during installation to give a single torque transfer result for a given RPM.

Figure 1:
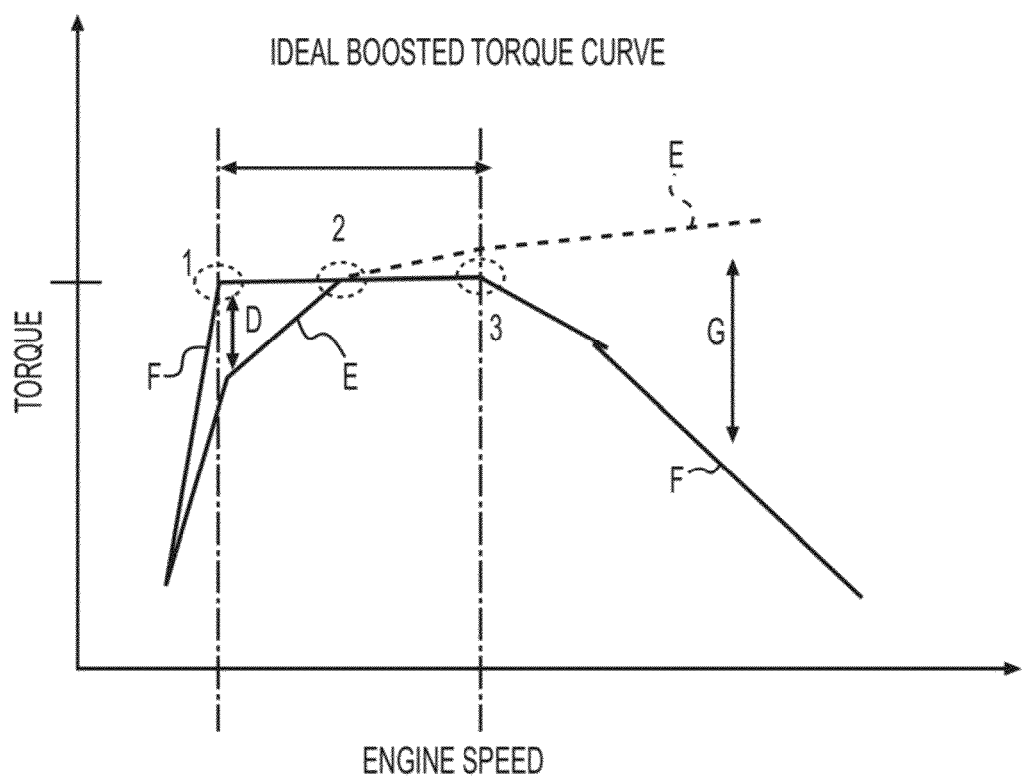
FIG. 1 is an example of an ideal boosted torque curve and a prior art torque curve.

Since the volume of air supplied to the engine directly affects the torque output of the engine, the fixed ratio pulley system supplies a predictable volume of air to the engine for a predictable increase in torque. Line E of FIG. 1 shows the torque curve for a prior art fixed pulley ratio supercharged engine. At low engine speeds, up to point 1, the transfer of energy from the engine to the supercharger is inadequate to spin the rotor fast enough for an ideal amount of torque. The difference between the ideal torque, shown on line F, and the prior art torque is shown at D. Point 1 is, for many reasons, one of the most critical points in an engine's operating range. It is the point at which a vehicle has gone from an idled condition to a moving condition, and typically is a high load condition.

To achieve the ideal torque at point 1, the supercharger must provide more air to the engine, but must not operate outside its capacity. With engine speed and supercharger speed directly related by the use of a fixed pulley system, as engine speed increases, the supercharger is at risk of overspeeding. Therefore, one cannot increase the ratio between the pulleys too much to achieve a torque near ideal at point 1, since this will cause an overspeed in the supercharger at later engine operating speeds. As a compromise, the prior art designs typically accept a decrease in torque at point 1 so that at a point 2, the system matches the ideal torque curve. Past this point, the supercharger supplies too much air, but is within its operational speed. If the air were supplied to the engine, it would cause an excessive amount of torque generation, shown at G. To avoid the excess torque, the excess air is diverted by, for example, a bypass valve to prevent oversupply of air to the combustion chamber of the engine. The bypass valve can allow recirculation of air, or an outlet for air. In either scenario, a significant amount of energy is wasted after point 2 to adjust the air supply to bring the torque down from the fixed-ratio oversupply in the dashed portion of line E down to the ideal torque supply on line F.

To achieve the ideal boosted torque curve, a continuously variable transmission (CVT) is used in place of the fixed ratio torque transfer system. The speed of the supercharger may be controlled so that the airflow output matches the required flowrate of the engine. The variation in supercharger speed allows for more customized variations in the torque output of an internal combustion engine. The CVT may be used to control the speed of the supercharger "independent" of the engine RPM and "dependent" on desired engine airflow under the commanded conditions. Using electronic control with the supercharger allows for more customization than a fixed mechanical system because the computer control can account for a greater number of variables, such as wheel slip, yaw, accelerator angle, steering wheel angle, air temperature, supercharger temperature, engine temperature, fuel ratio, etc.

The CVT can be one of many types of devices allowing a rotational difference between the engine crank shaft and the supercharger drive shaft. A mechanical type toroid, belt, planetary, or cone CVT allows for rotational energy transfer from the crank shaft to the drive shaft. Or, the CVT can be electrical, such as an independent electric motor.

The CVT allows for a range of speeds on the drive shaft and preferably, instead of fixed stepwise adjustments, allows for discrete adjustments in the speed ratio between the crankshaft and the driveshaft. The speeds can be greater than or less than the rotations per minute (RPMs) on the motor. The CVT allows for a customizable air supply, and therefore, customizable torque output. This eliminates the need for a bypass valve and restricts or eliminates the times at which a throttle valve is required. Use of a CVT also enables control of the acceleration event to tailor the dependence between torque at the crankshaft and torque at the driveshaft. Computer control can adjust how quickly drive shaft speed changes and this can result in tailoring torque output by the engine during an acceleration event. In application, this control can smooth the acceleration experience to eliminate harsh transitions, thus reducing wear on parts and improving driver experience.

When affiliated with a control system, the CVT can be driven at appropriate speeds for a particular application. For example, control electronics can sense an incipient wheel slip, calculate needed torque adjustments, determine engine airflow demands, and adjust the CVT to spin the supercharger at the ideal rate to supply the requisite airflow to the engine. Other conditions, such as idling, engine braking, low mu conditions, etc. can likewise be a part of control electronics.

In FIG. 1, a high torque output is achievable at the low engine speeds of point 1, and an optimal torque is achievable at point 2. At point 3, the supercharger can reach its peak airflow substantially simultaneously to the engine reaching its peak power. For points above point 3, the airflow can remain nearly constant. The engine output torque will decrease, yet output power will remain largely the same. Instead of the significant power waste in the area G, a power savings is achieved.

Put another way, CVT system operation is limited by the maximum engine operating RPM and the maximum supercharger RPM. So, for the fixed torque transfer design, the system typically uses an engine with a displacement capacity suitable for point 2 and a supercharger suitable for point 2. Because of the disparities in capacities at other points, the system is limited to avoid overspeeding. For example, the engine RPM is restricted to avoid overspeeding the supercharger, resulting in excess engine capacity. This restriction disappears in the CVT design because the CVT can be controlled to allow the engine to reach its maximum operating RPM and the supercharger can be controlled to reach its maximum RPM. Thus, the full capacity of the system can be utilized.

An additional benefit is achieved by using a CVT: the fuel economy can be increased more than 10% by engine downspeeding. The engine can be operated at lower engine speeds, such as 1200 RPMs, which reduces engine friction. Ideally, the engine will produce high torque at the low engine speed to maximize the downspeeding benefits.

Current designs have inadequate boost, or air supply, but a CVT design allows the supercharger to supply air independent of engine speed, which increases boost at low engine speed, which translates in to increased "low end torque." With more torque at low engine speeds, longer transmission gear ratios can be used at low engine speed, resulting in further increases in fuel economy.

Yet another benefit to a supercharged engine can be achieved by using a smaller size supercharger. Prior art designs select a supercharger size based upon the airflow needed at point 2 of FIG. 1. At rotational speeds greater than point 2, supercharger efficiency is limited by internal sealing. At low rotational speeds, and thus high pressure ratios, supercharger efficiency decreases because air is internally leaking backwards, from outlet to inlet. By using a smaller supercharger to achieve the ideal airflow, less backwards leaking of air occurs. The smaller supercharger must be operated at higher rotational speeds to achieve the same airflow as a larger supercharger. However, the benefits achieved, such as size, weight, and tolerance reductions, provide valuable increases in vehicle efficiency and CAFE compliance.

The following comparison illustrates the size reduction achieved using the CVT design. A fixed pulley design would utilize a positive displacement pump that is between 30%-70% the size of engine displacement. So, for a 2 Liter engine, a supercharger of 0.6 Liter to 1.5 Liter could be selected. However, using the CVT allows for at least a 20% reduction in supercharger size so that for the same 2 Liter engine, a supercharger of 0.036 Liter to 0.9 Liter can be utilized. So, for the CVT design, the supercharger displacement can be 10%-60% of the engine displacement. The principles apply to engines of all sizes, such as 0.6 Liter to 8 Liter gasoline engines, and such as 0.6 Liter to upwards of 16 Liter diesel engines.

Another benefit of using the smaller supercharger in combination with the CVT is that the bypass valve can be eliminated. The CVT comprises a combination of mechanisms that allow it to seamlessly switch along a range of effective gear ratios between a minimum and maximum value. Therefore, the supercharger speed can be varied such that the supercharger will provide only the exact air required by the engine. The supercharger may be spun faster at low engine speeds to achieve high boost, and spun slower at high engine speeds to prevent overspeeding. Regardless of whether a positive displacement type or centrifugal type supercharger is used, the bypass valve is eliminated from the system.

Controlling the CVT becomes a part of the vehicle electronics, and thus a calibration strategy is required to determine the position, speed, and functionality of the supercharger under all conditions. The calibration strategy may be implemented by, for example, a computer 230, 330 having a processor 231, 331, memory 234, 334, algorithm stored in the memory, and control electronics. The control electronics may be part of a central computer processor or may be independent control electronics with communication capabilities. Allocation programming may be used to share a processor, or a discrete device may be dedicated to supercharger operations.

The computer can also be used for controlling other devices, such as the engine, a fuel injection system, throttling components, and exhaust gas recirculation valves. The computer can be an on-board system, part of an electronic control unit, or a plurality of sub-computing devices that communicate with a main computing device. That is, the computer can be a single central processor or a network of a plurality of processors. The central or plurality of processors can comprise allocation programming for performing the various calculations, comparisons, determinations, commands, etc. as needed so that certain functions are serially performed, and others are parallel to implement efficient data processing. Sensor information, algorithms, and outputs can be stored, updated, and deleted as needed in the memory.

Appropriate sensors, data connections, and control electronics are distributed along the vehicle to achieve desired controllability. The sensors may collect data on a variety of conditions, such as speed, temperature, particulates, etc. Appropriate sensors may be placed near the wheel hubs, drive axle, engine cams, air intake, throttle, and/or other locations to sense operating conditions and driver inputs. The data collected may be used to adjust supercharger drive shaft speed to increase or decrease engine torque output via adjustments to the air supplied to the engine.

Control programming may be stored on an onboard computer, such as an electronic control unit (ECU) 230, 330. The peak torque output, and related airflow demands, of the engine can be calculated for any operational conditions of the vehicle. The programming may store the mass air flow or displacement capabilities of the engine and supercharger along with the maximum RPM data for each of the drive shaft and crank shaft. Based on sensor data, the processor can compute air volume changes necessary to operate the engine at peak output. So, if driver demand indicates a request for vehicle acceleration, the ECU gathers system data to adjust the RPMs of the supercharger according to stored algorithms to bring the vehicle to the desired speed. If sensors perceive an imminent slip or rollover, the ECU can process data and emit commands to adjust engine torque output. And, if torque demand is low, the ECU can process data and emit commands to downspeed the engine or transfer torque from the driveshaft to the crankshaft. Since the airflow demand of the engine is related to the engine torque output, adjusting the air flowing to the engine will result in adjustments to the torque necessary to implement the desired changes to the vehicle operation.

Thus, a vehicle may comprise a computer program product with a tangible storage medium, such as memory 236, 336. The control strategy may be stored on the storage medium in the form of a program. The program, when executed by a processor 231, 331, can implement a control strategy via a vehicle control system. The control system may comprise data collection devices such as sensors for collecting data on RPM, air velocity, air mass flow, temperature, torque, inclination, on/off status, etc. The control system may comprise transmit and receive devices and appropriate electronic connectivity to send the data to computer 230, 330 and to receive control signals therefrom.

The computer 230, 330 can receive sensor data indicating operating conditions of a vehicle. For the illustrated examples, a single sensor is indicated, though more than one sensor may be affiliated with each corresponding device or a sensor may perform more than one function. For example, sensor data may include driver inputs 235 such as on/off toggling of the AWD/RWD/FWD capabilities, inclination angle of the acceleration or brake pedals, or steering wheel adjustments. Other sensor inputs may include one or more of throttle position via throttle sensor 220, 320, drive shaft RPMs or air mass flow via supercharger sensor 211, intercooler temperature via temperature sensor 212, crank shaft RPMs, engine temperature, piston positions, or displacement conditions of engine via engine sensor 213, exhaust conditions via exhaust sensor 215, CVT torque transfer via CVT sensor 216, CVT RPMs via pulley sensors 217, 218, transmission torque transfer via transmission sensor 234, front axle 222 and rear axle 223 conditions such as wheel angle, differential use, brake use, or other driveline conditions via driveline sensors 232, 233, 332, and 333.

The received sensor data enables the creation of a feedback loop for confirming proper vehicle operation while also enabling updates to the control signals to respond to variations in operating conditions. As indicated below in Table 2, each engine crank shaft RPM can have a wide range of corresponding drive shaft RPMs to tailor the boost to the engine. Thus, the control strategy can include receiving engine data indicating a current RPM of the crank shaft. Based on the received engine data, the CVT can be adjusted to provide only the amount of air needed to achieve a target torque output. Thus, the control strategy avoids oversupply, undersupply and the need for a bypass valve.

The received sensor data and the received engine data are processed to calculate an engine airflow demand for outputting peak torque on the crank shaft of the engine. The peak torque can be only the torque necessary to respond to the operating conditions, or the peak torque can be the most torque that can be provided by the engine at its current RPM. The control strategy can include subroutines for avoiding energy waste, such as by operating the vehicle at an RPM that results in the torque output being the most that can be provided by the engine and also equaling only the torque necessary for the operating conditions. Thus, it may be necessary to calculate a peak torque output for the engine and compare it to a sensed actual torque output and to control the control system to bring the actual torque output to the calculated value. In any case, the control system controls the CVT torque transmission to satisfy the calculated airflow demands of the engine. The process can be iterative, so that as operating conditions and or engine RPMs vary, changes in engine airflow demand can be accounted for with adjustments to the CVT.

The intermediary steps of calculating airflow demand or calculating torque outputs may be in addition to the ultimate step of processing the received sensor data and the received engine data to determine a control signal for controlling the CVT 206, 306. The control signal may be transmitted to the CVT, the CVT connected to a drive shaft of a supercharger, the supercharger connected to move air to the engine such that the moved air equals engine airflow demand for outputting peak torque in response to the operating conditions. The control strategy may adjust the transmitted control signal as the received sensor data varies such that a crank shaft RPM corresponds to a plurality of different control signals to satisfy airflow demands based on variations in the operating conditions. To achieve this, the control strategy may be iterative.

The control system controls the CVT based on the air flow demand for an engine RPM in the engine operating range such that the supercharger variably pumps air across the supercharger operating range as the engine operates across the engine operating range. It is possible that the design results in only a subrange of operating conditions enabling peak torque output. For example, it may only be possible to achieve peak torque output at 15%-90% of the engine maximum RPMs.

Control programming is implemented to enable the calculation of peak torque values and to enable the collection of actual torque values. The control system can adjust the CVT torque output to bring the actual and calculated peak torque values in to alignment.

The control system can also control the system so that at any given RPM of the crank shaft, the supercharger can operate at its maximum RPM.

In addition to the above calculations, it is possible to store data so that, as new inputs are sensed and received, the resulting data can be compared to select a CVT torque output or an airflow demand value suitable for the operating conditions.

Further strategy may be implemented to adjust the driveline and combustion system components to use the torque output from the engine and to implement air flow control. For example, additional subroutines may change the angular acceleration of the supercharger to limit the maximum torque provided during a transition or acceleration event.

The following example illustrates a contrast between a fixed ratio pulley design and a CVT design. A 2 L engine with a maximum speed of 6500 RPM is combined with a 0.57 L supercharger with a maximum speed of 20,000 RPM. Example 1 includes a fixed pulley with a ratio of 4:1 to transfer energy from the engine to the supercharger. Example 2 uses the same engine and supercharger with a CVT having a range of energy transmitting ratios.

Figure 4:
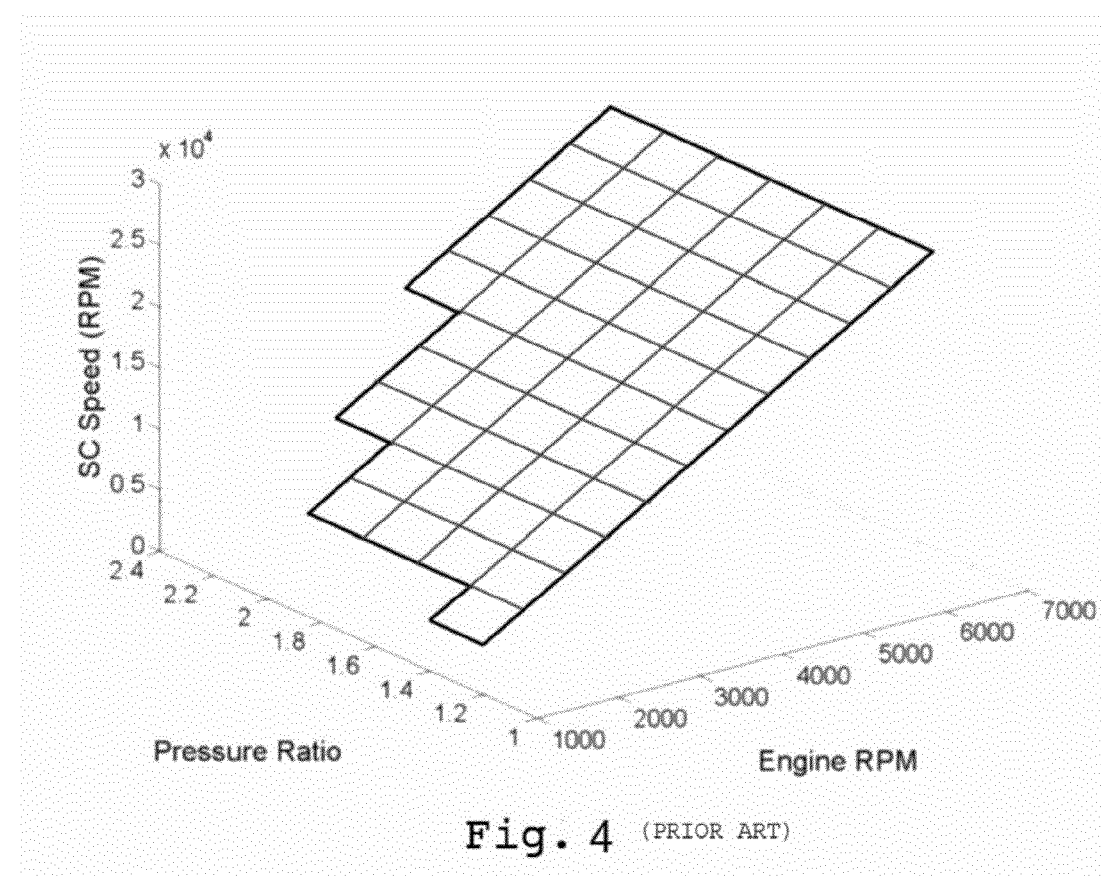
FIG. 4 is a graph of operating speed for an example of a prior art fixed pulley ratio system supercharger.

Table 1 (example 1) shows supercharger speed in RPMs for given pressure ratios (vertical) and engine speeds in RPMs (horizontal). The supercharger speed is linearly related to engine speed for the fixed ratio pulley example. When the engine is at 5000 RPMs, the supercharger is slightly over its capacity. Past an engine speed of 5500 RPMs, the supercharger is far past its limiting speed 20000 RPMs. Therefore, to protect the supercharger, the engine cannot operate past 5000 RPMs. This results in wasted capacity, as the engine is not utilized along its full operational range. Also indicated by the blank cells in Table 1, the fixed ratio pulley system cannot provide a range of pressure ratios. That is, the system cannot provide high boost at low engine RPMs. The results of Table 1 are also illustrated in FIG. 4, which plots supercharger speed in RPMs against the pressure ratio and engine speed in RPMs.

TABLE 1

|      | 1000 | 1500 | 2000 | 2500  | 3000  | 3500  | 4000  | 4500  | 5000  | 5500  | 6000  | 6500  |
|------|------|------|------|-------|-------|-------|-------|-------|-------|-------|-------|-------|
| 1.2  | 4100 | 6150 | 8200 | 10250 | 12300 | 14350 | 16400 | 18450 | 20500 | 22550 | 24600 | 26650 |
| 1.4  | 4100 | 6150 | 8200 | 10250 | 12300 | 14350 | 16400 | 18450 | 20500 | 22550 | 24600 | 26650 |
| 1.6  |      | 6150 | 8200 | 10250 | 12300 | 14350 | 16400 | 18450 | 20500 | 22550 | 24600 | 26650 |
| 1.8  |      | 6150 | 8200 | 10250 | 12300 | 14350 | 16400 | 18450 | 20500 | 22550 | 24600 | 26650 |
| 2.0  |      |      |      | 10250 | 12300 | 14350 | 16400 | 18450 | 20500 | 22550 | 24600 | 26650 |
| 2.2  |      |      |      |       |       |       | 16400 | 18450 | 20500 | 22550 | 24600 | 26650 |
| 2.4  |      |      |      |       |       |       |       |       |       |       |       | 26650 |

Figure 5:
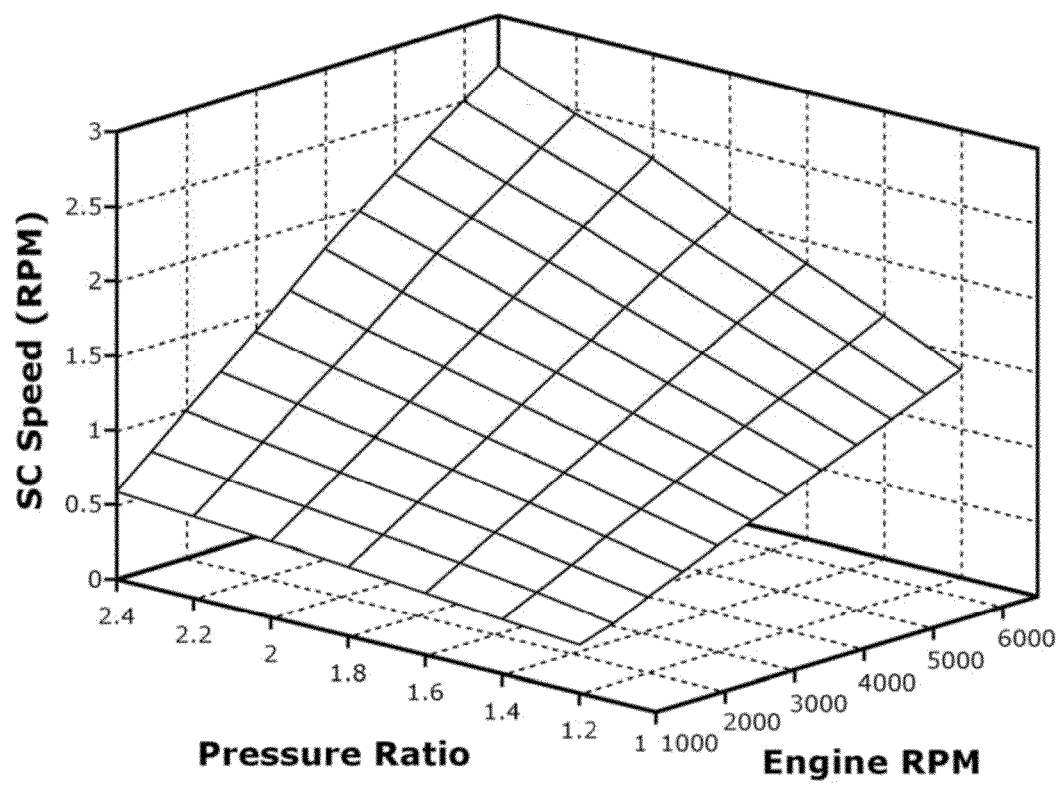
FIG. 5 is a graph of operating speed for an example of a CVT and supercharger arrangement.

Table 2 (example 2) shows that the CVT-driven supercharger speed is controlled independent of engine speed (horizontal), and that a greater range of pressure ratios (vertical) is achieved. The increased pressure ratio range allows for a greater range of boost values. In addition, the supercharger may spin faster for high boost and low engine RPMs and then spin slower for low boost and high engine RPMs. The results of Table 2 are also illustrated in FIG. 5, which plots supercharger speed in RPMs against the pressure ratio and engine speed in RPMs

TABLE 2

|      | 1000   | 1500   | 2000   | 2500    | 3000    | 3500    | 4000    | 4500    | 5000    | 5500    | 6000    | 6050    |
|------|--------|--------|--------|---------|---------|---------|---------|---------|---------|---------|---------|---------|
| 1.2  | 3234.6 | 3994.0 | 5063.5 | 6058.7  | 7076.8  | 8047.8  | 9038.3  | 10020.2 | 11013.3 | 11990.7 | 12975.2 |         |
| 1.4  | 3691.2 | 4803.5 | 5916.0 | 7099.0  | 8245.0  | 9405.1  | 10551.7 | 11697.1 | 12833.9 | 13953.4 | 15118.7 | 13928.9 |
| 1.6  | 4190.6 | 5526.0 | 6820.7 | 8101.7  | 9429.8  | 10727.8 | 11991.5 | 13302.4 | 14611.8 | 15936.8 | 17217.3 | 16267.6 |
| 1.8  | 4682.3 | 6097.3 | 7585.4 | 9054.8  | 10512.4 | 11973.5 | 13448.2 | 14924.7 | 16407.5 | 17857.1 | 19279.4 | 18482.6 |
| 2.0  | 5083.5 | 6688.2 | 8317.5 | 9953.4  | 11602.0 | 13214.8 | 14850.5 | 16521.7 | 18170.5 | 19807.0 | 21417.5 | 20656.6 |
| 2.2  | 5474.7 | 7252.6 | 9070.3 | 10875.6 | 12659.0 | 14451.8 | 16305.2 | 18167.3 | 19858.7 | 21501.0 | 23104.5 | 24669.5 |
| 2.4  | 5859.7 | 7852.3 | 9852.1 | 11784.4 | 13786.4 | 15815.5 | 17896.1 | 19755.0 | 21546.4 | 23235.4 | 24976.8 | 26623.0 |

Because the fixed pulley ratio supercharger of Table 1 is driven at a fixed ratio, the limiting speed must be matched to the maximum engine speed. Therefore, it is not achievable in the fixed pulley example to spin the engine above 5000 RPM without damaging the supercharger.

The same capacity supercharger in the CVT example of Table 2 has the same limiting speed, yet the pulley ratio can change to allow the supercharger to operate along its peak limiting speed over the operating range of the engine. The supercharger RPMs can also be tailored to specific engine airflow demands. Thus, the engine can receive a precise amount of air for optimal operation. This avoids the need to bypass excess capacity and, for most of the operational range, limits the need to throttle air intake. The supercharger speed is adjusted to limit air intake at low demand, and is accelerated during high demand. Because of the precise combustion airflow control, the fuel efficiency of the system is greatly enhanced over the fixed pulley design.

Most traditional spark ignition internal combustion engines utilize an airflow limiting feature such as a throttle valve in a throttle body to create a subatmospheric pressure in the intake manifold. To create the subatmospheric pressure, power is consumed. The use of the throttle valve may be eliminated by precise control of the supercharger speeds under all non-idle operating conditions.

When using a CVT in combination with a supercharger, greater operating freedom on the supercharger results in power savings. The drive shaft and rotors can be controlled to force air towards the engine, or to restrict air to the engine. By slowing the rotors via the CVT, therefore creating air restriction, subatmospheric inlet conditions can be created in the intake manifold with less power consumption when compared to the prior art. Slowing the rotors can be achieved via a change in the power transmission ratio of the CVT, and, as discussed in more detail below, the resultant torque created on the rotors can be supplied back the engine crank shaft for use in the system.

With the CVT driven supercharger, the CVT can slow down the lobed rotors enough to perform some or all of the necessary restriction previously provided by the throttle valve. This creates a negative pressure differential across the supercharger. The negative pressure differential will generate torque on the rotors. The drive system and engine crank shaft must resist the torque, but in general, a portion of the torque energy on the rotors is supplied back to the engine crank shaft. The torque transfer results in an energy gain for the system. When using a centrifugal supercharger for supercharger 201, 301, it may not be possible to transfer torque back to the drive shaft, as this may damage the impeller.

In addition to the power transfer benefits, the negative pressure differential is beneficial for such strategies as controlling manifold pressure to ensure adequate Exhaust Gas Recirculation (EGR). That is, the negative pressure differential helps draw air from the nearly atmospheric pressure exhaust stream, through an EGR valve, and back in to the intake stream of the engine.

Examples of torque energy transfer can be seen in FIGS. 2A-3E. FIGS. 2D and 3D also illustrate EGR benefits. The examples include supercharger 201, 301. The supercharger is a positive displacement air pump. The positive displacement air pump may be a Roots type, screw-type, or piston compressor. A supercharger of this type typically comprises a housing with an inlet and an outlet, a drive shaft connected to turn the rotors, screws, or pump the pistons as appropriate. A volume of air is displaced at a rate based on the speed of rotation of the drive shaft. The air is blown and may be compressed outside the supercharger by the motion. The discussion below refers to a supercharger comprised of parallel lobed rotors, though the other types may be used. For example, a centrifugal supercharger may be used, with the drive shaft operatively coupled to an impeller. But, modifications should be made to prevent excessive torque on the impeller, thus limiting the throttling capabilities of the centrifugal supercharger and limiting the ability to transfer torque to the crank shaft. In either the positive displacement or centrifugal designs, the supercharger is configured to move air from an inlet to an outlet, and the supercharger has an operating range from an idled condition up to a maximum rotations per minute of the drive shaft.

The air flow volume, air flow rate, and air flow pressure can be controlled by selecting a supercharger of appropriate size and by controlling the RPMs of the drive shaft. While specific atmospheric pressures and ratios are shown in the examples, other values may be implemented by selecting one or more of a drive shaft speed, CVT setting, CVT type, throttle valve position, engine size, supercharger size, supercharger type, pulley ratio, or engine RPM. The systems in each of FIGS. 2A-3E can achieve a range of positive and negative pressure values, in addition to the singular values shown, therefore allowing the system to operate under a wide range of load and environmental conditions. For example, the system may yield substantial low end torque and operate in high altitude areas.

Figure 2A:
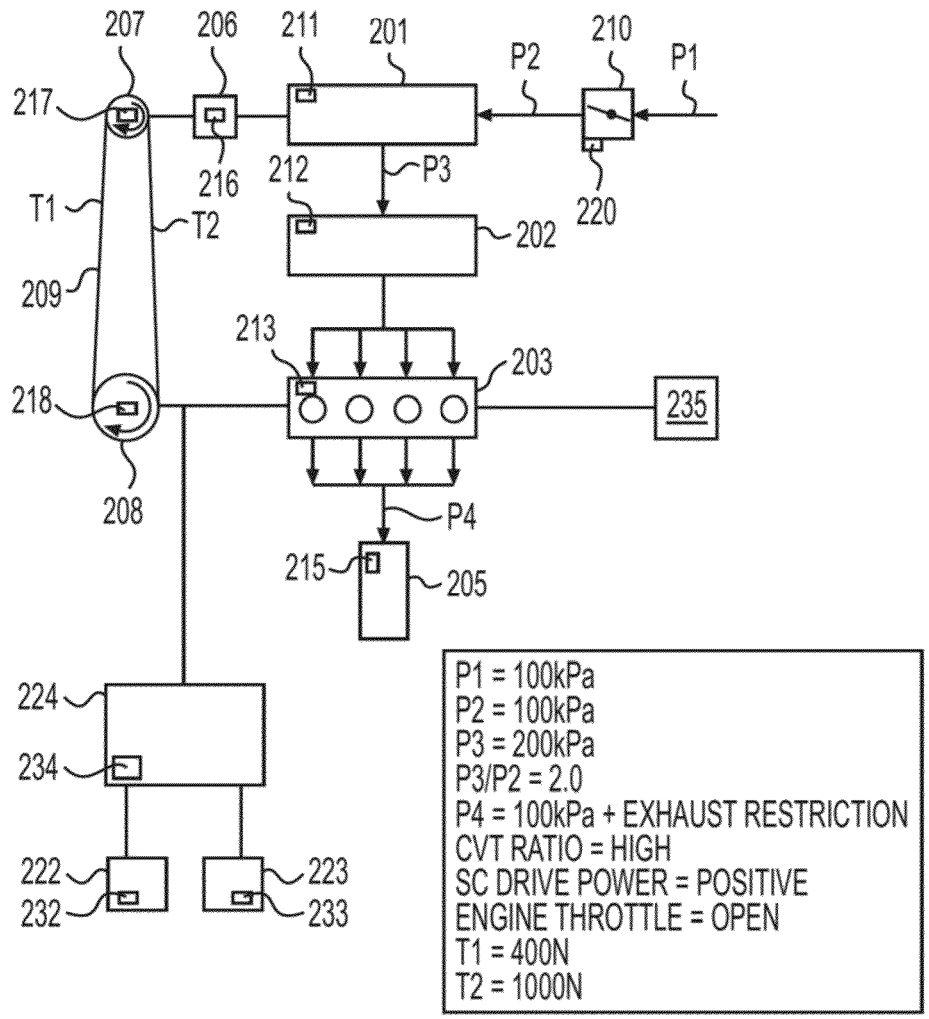
FIG. 2A is a schematic example of an engine system with an open upstream throttle valve and a boosted air supply.
Figure 2B:
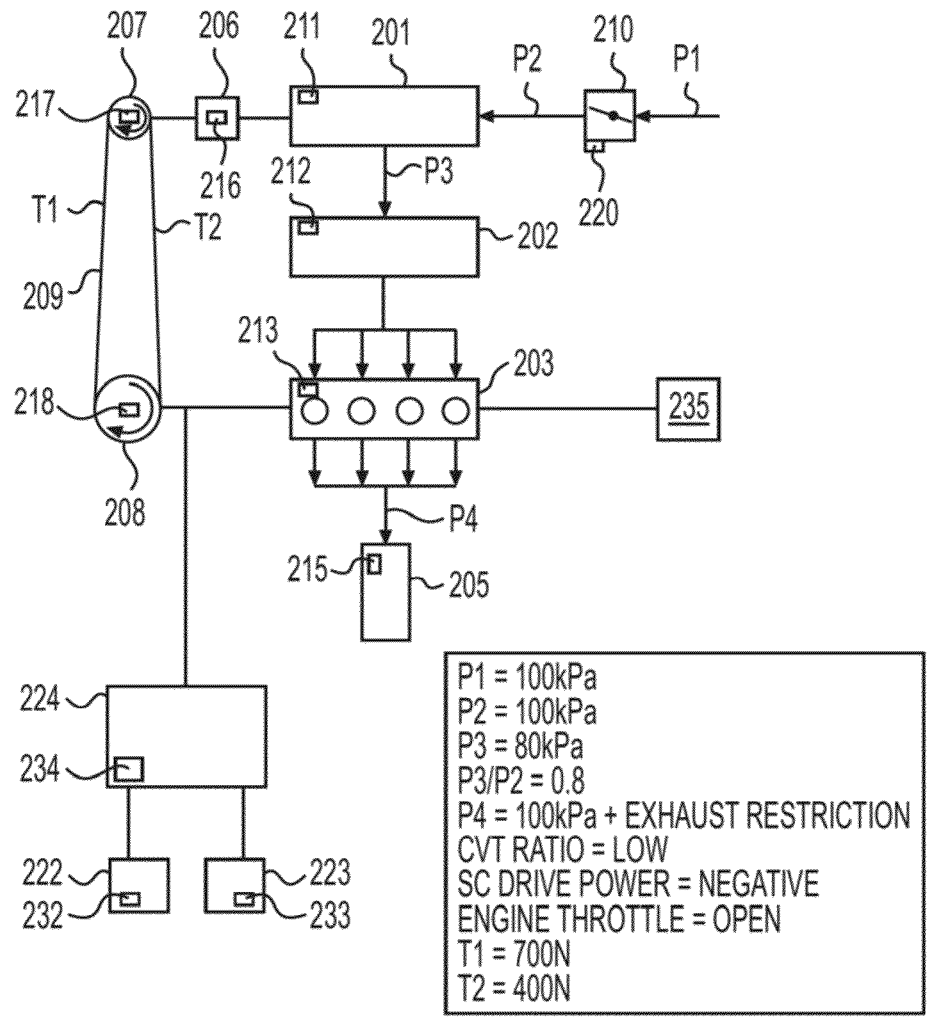
FIG. 2B is a schematic example of an engine system with an open upstream throttle valve and supercharger throttling.
Figure 2C:
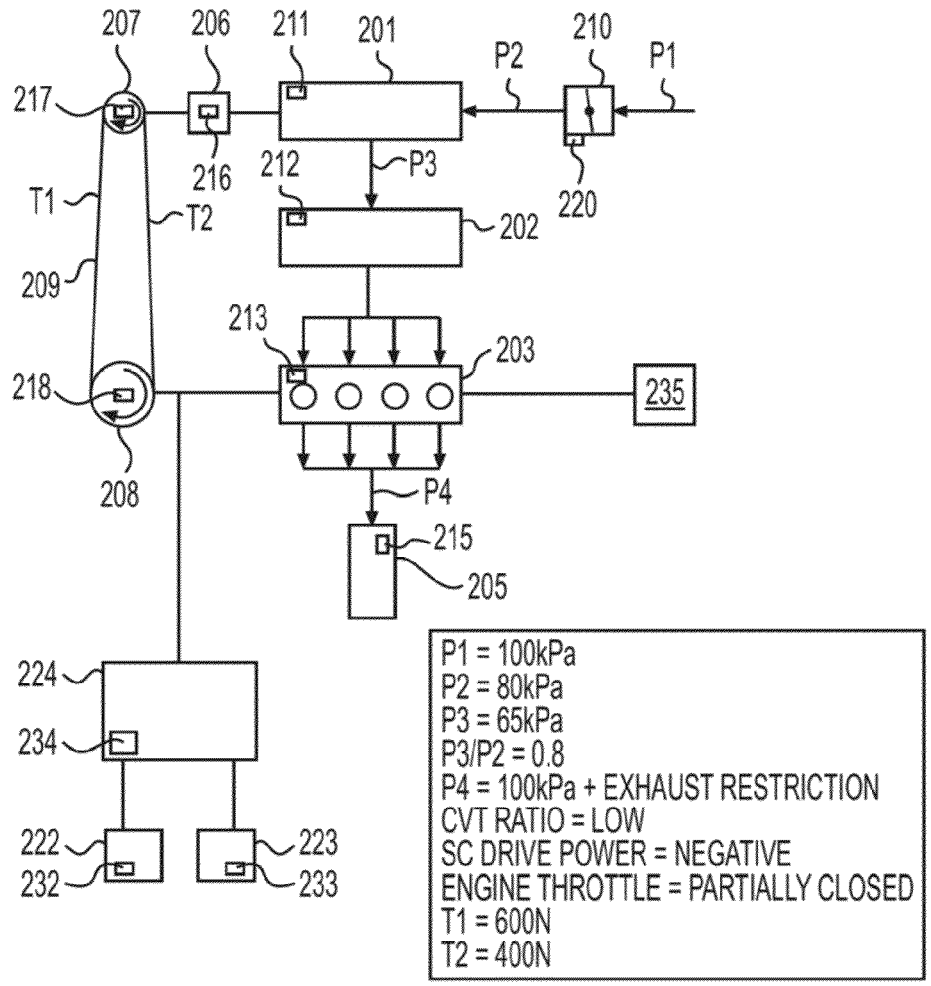
FIG. 2C is a schematic example of an engine system with a partially closed upstream throttle valve and supercharger throttling.
Figure 2D:
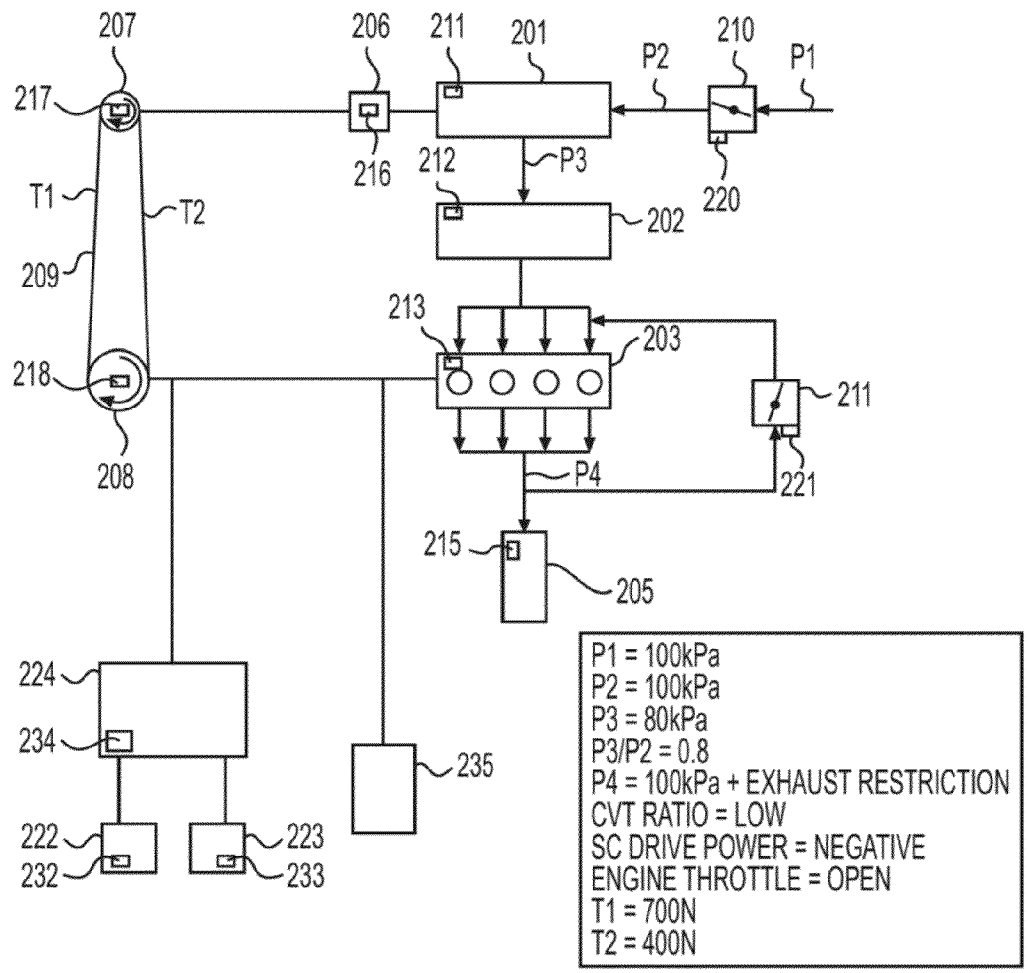
FIG. 2D is a schematic example of an engine system with an open upstream throttle valve and an open exhaust gas recirculation (EGR) valve.
Figure 2E:
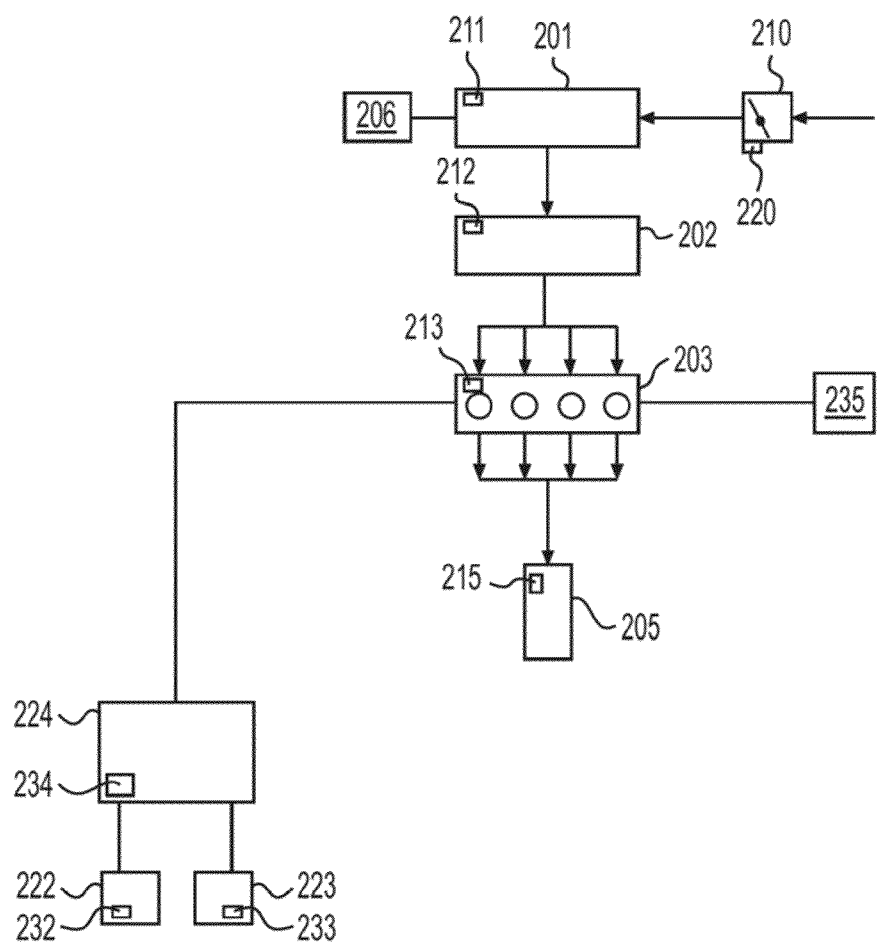
FIG. 2E is a schematic example of an engine system having a CVT powered independent of the engine crank shaft.
Figure 2F:
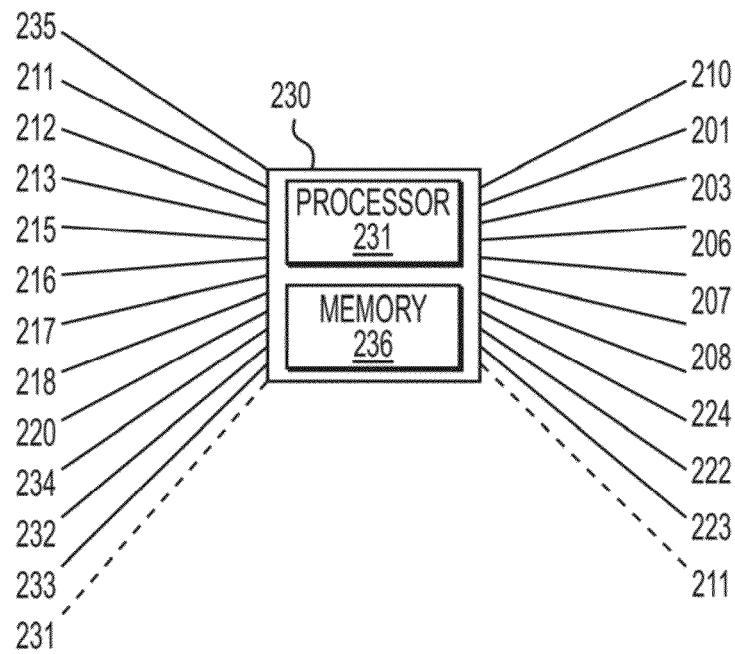
FIG. 2F is a schematic example showing sensor inputs to an electronic control unit and outputs to controlled devices.
Figure 3A:
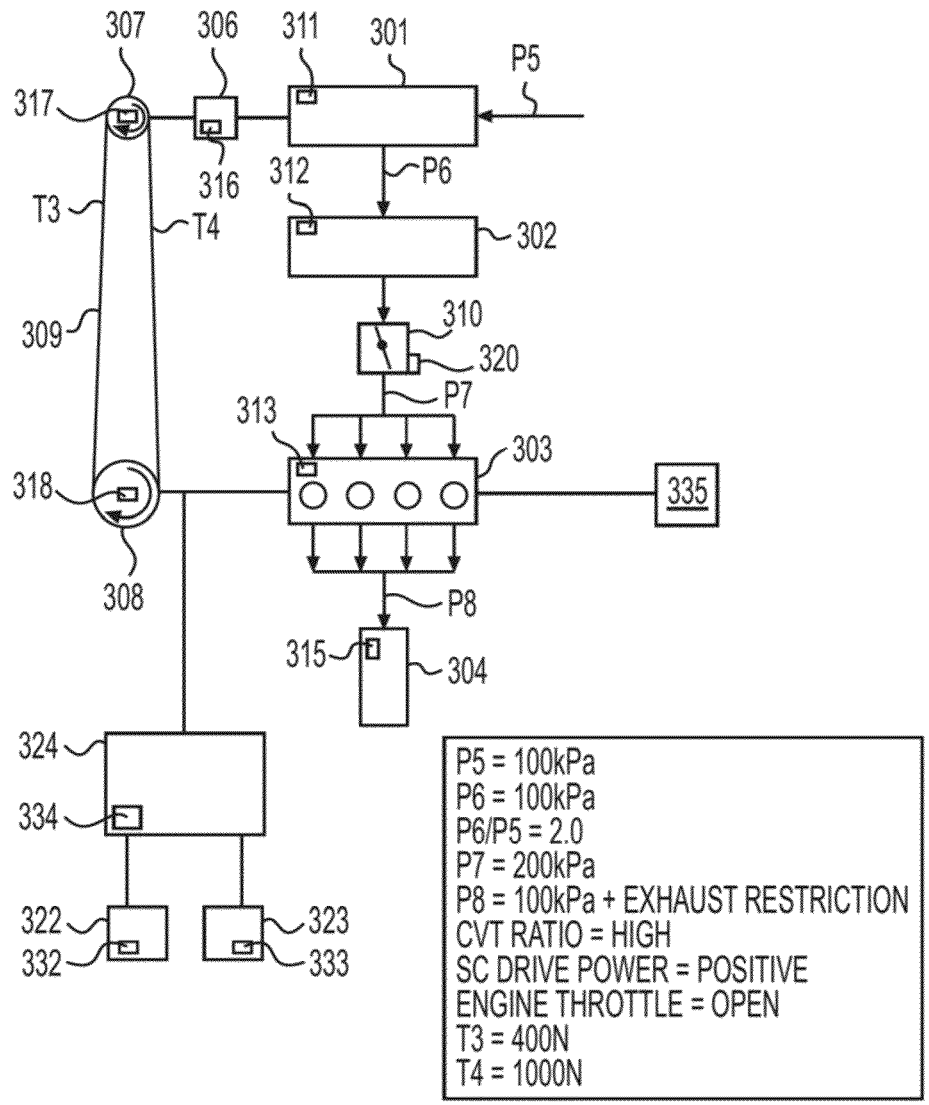
FIG. 3A is a schematic example of an engine system with an open downstream throttle and a boosted air supply.
Figure 3B:
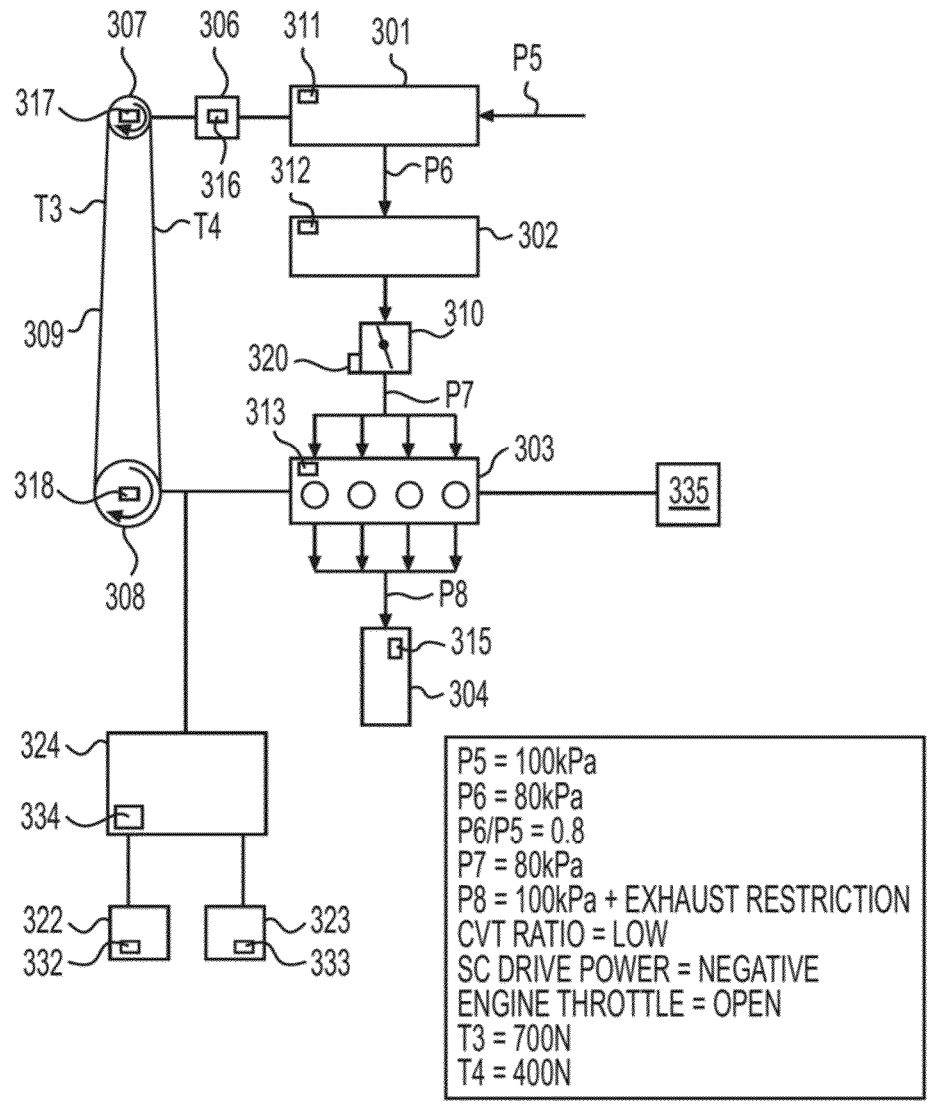
FIG. 3B is a schematic example of an engine system with an open downstream throttle valve and supercharger throttling.
Figure 3C:
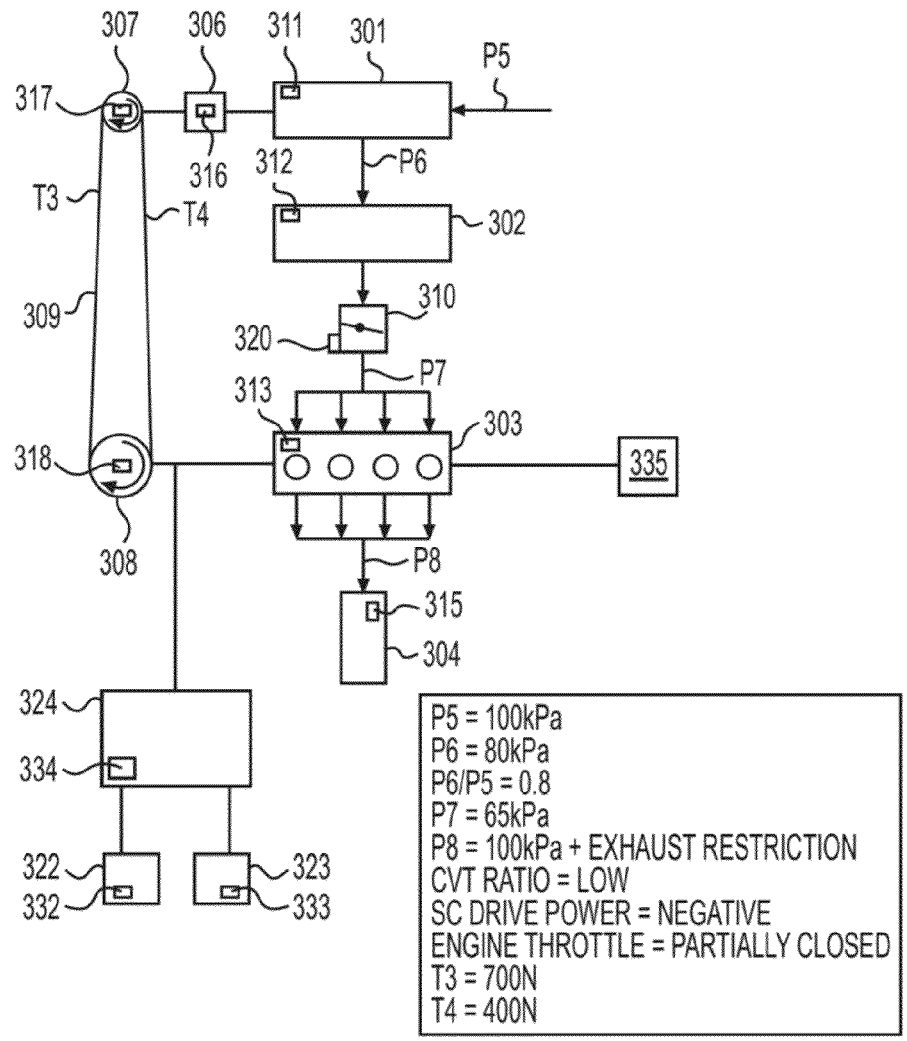
FIG. 3C is a schematic example of an engine system with a partially closed downstream throttle valve and supercharger throttling.
Figure 3D:
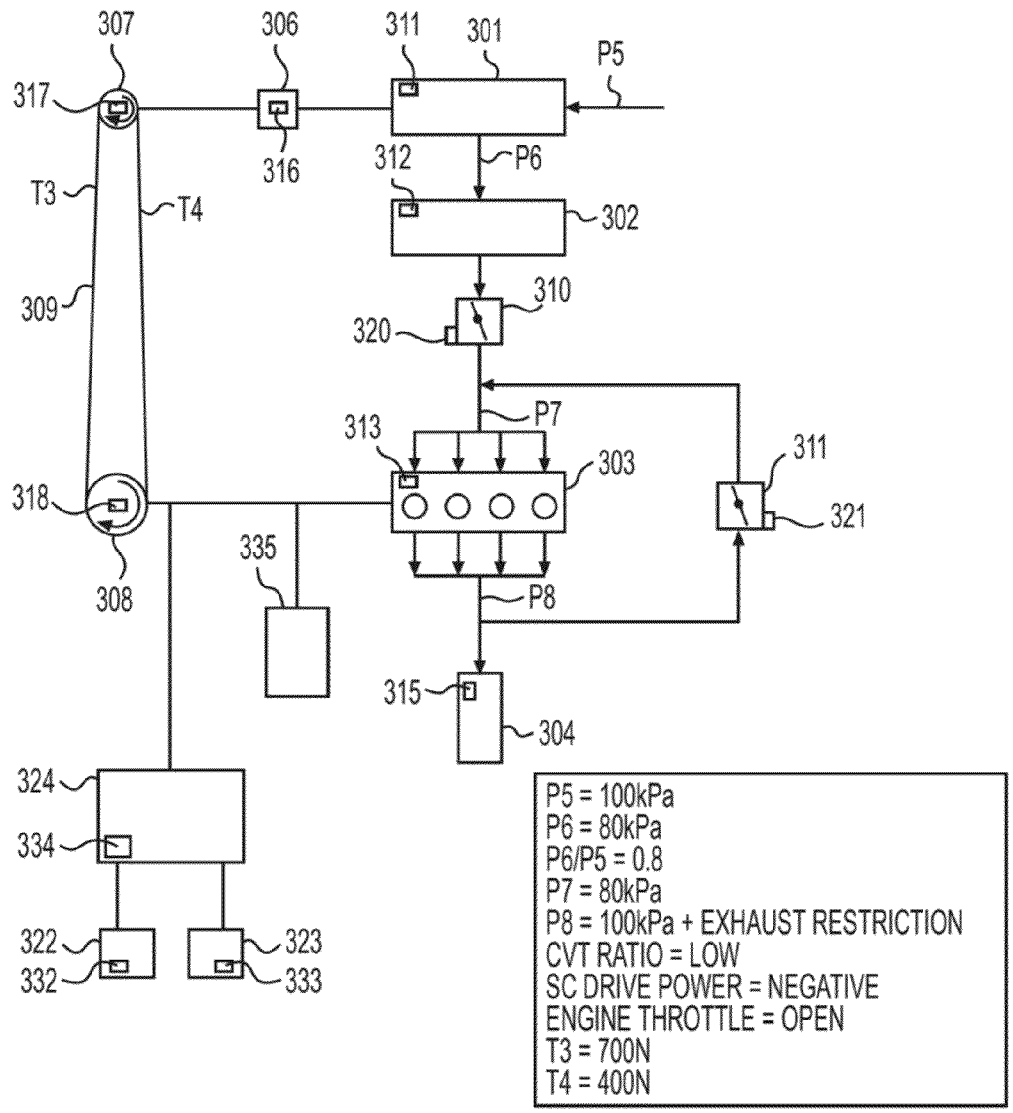
FIG. 3D is a schematic example of an engine system with an open downstream throttle valve and an open EGR valve.
Figure 3E:
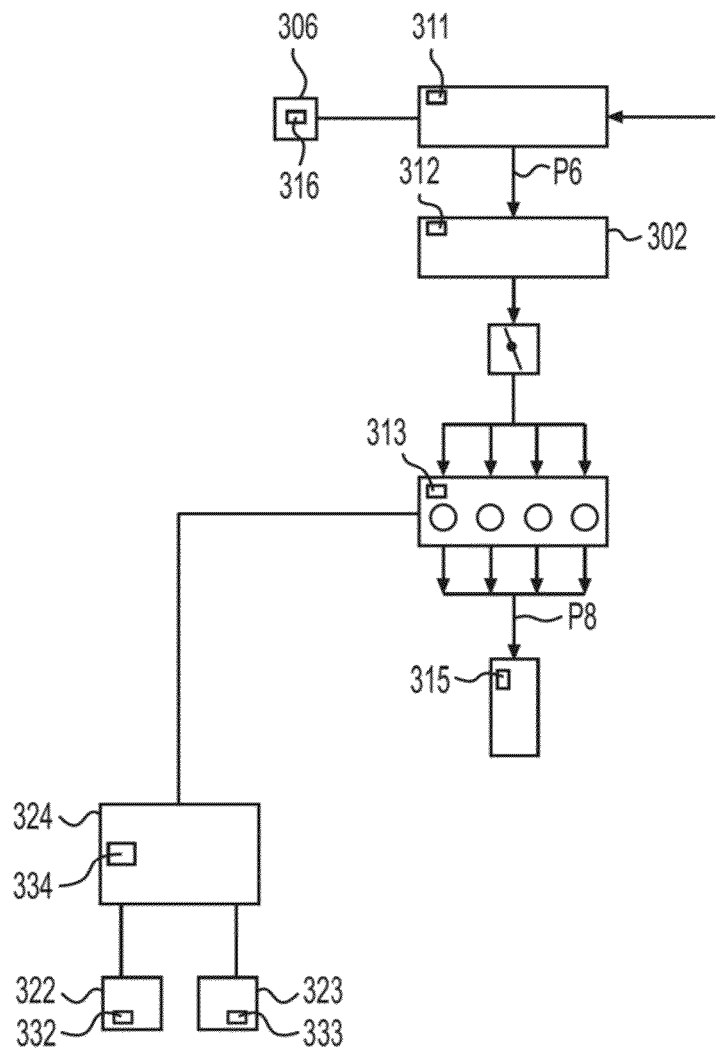
FIG. 3E is a schematic example of an engine system have a CVT powered independent of the engine crank shaft.

The examples of FIGS. 2A-3E use a 0.57 L supercharger with a limiting speed of 20,000 RPMs. CVT 206, 301 controls the speed of rotation of associated supercharger rotors and can be any one of a mechanical or electrical motor type, including, for example, toroidal, belt, planetary, and conical. While a belt and pulley type CVT is illustrated in FIGS. 2A-2D and 3A-3D, other energy transferring or transmitting CVTs may also be used. For example, FIGS. 2E and 3E illustrate an embodiment where the crank shaft does not directly power the CVT, and the CVT 206, 306 is a controllable independent motor.

Engine 203, 303 may be a combustion type for an automobile, or other motive device, and may comprise 4, 6, 8, or 12 cylinders. An inner crank shaft connects to connecting rods, for actuation by pistons associated with each cylinder. An oil sump, piston seals, and spark plugs are also included. Each cylinder has at least one valve for exchanging air, but may also have more valves, such as two air intake valves and two exhaust outlet valves. An intake manifold system may be associated with the air intake valves to distribute air and can comprise several air conduits, arranged in one example as one conduit for each air intake valve, or the manifold system can comprise a single distribution body. In addition, the exhaust outlet valves may have an associated exhaust manifold system comprising either an exhaust outlet conduit for each exhaust outlet valve, or a single distribution body.

In any case, combustion chambers are configured to receive air form the supercharger and to use the air in a combustion process along with injected fuel. The combustion chamber can receive and use a volume of air that can be controlled within a range to achieve a desired torque output. Air in excess of the desired quantity results in excessive torque output, and, an air quantity less than the desired quantity results in less torque output than desired. Thus, based on torque output desired, the engine can combust received air and fuel to achieve a desired torque output.

The engine has at least one airflow demand for each drive shaft RPM that results in peak torque output. The peak torque output is an ideal output for a given engine RPM that balances factors such as component wear and fuel efficiency, among others. The peak torque output is the maximum amount of torque that can be output at that RPM without excessive detrimental wear to the combustion chambers. The engine can be operated to result in only peak torque output at each RPM, or at operational conditions that re not ideal, based on computer control. The engine has an operating range from an idled condition up to a maximum RPM of the crank shaft.

The crankshaft of the engine may transfer torque to the CVT and to a transmission 224 and 324. The transmission can distribute torque to the front axle 222 and, via a power transfer unit or other driveline distribution mechanism, to a rear axle 223 of the vehicle. The front axle and rear axle can include left and right wheel hubs, and the vehicle may include more than two axles.

Optional throttle valves 210, 310 may be any art-recognized throttling mechanism for selectively restricting a volume of air flowing through a system, including, for example, a passageway with a rotatable butterfly plate, or a passageway with a rotatable pass-through plate.

A plurality of sensors are distributed in the system for cooperation with data processing and control electronics. Block diagrams affiliate sensors with their corresponding structures, and the exact locations and numbers of sensors may differ in implementation. For example, the engine may have a sensor for each combustion cylinder, or the driveline may comprise additional sensors for differentials, rear drive unit, etc. A schematic sensor may perform more than one function, for example, while a single sensor is illustrated, more than one sensor may be included for collecting speed, temperature, pressure, air quality (particulate), inclination, degree of restriction, etc. as appropriate for the device. Transmit and receive functionality may be included along with actuation means for implementing adjustments, as appropriate.

For example, throttle valve sensor 220 and 320 may include functionality to sense intake temperature, pressure, and air quality. The sensor may measure the degree to which the throttle valve is opened or closed, and actuation devices can adjust the degree of the throttle valve opening once data is transmitted to a processor and adjustments are calculated, with a resulting received adjustment command.

Figure 3F:
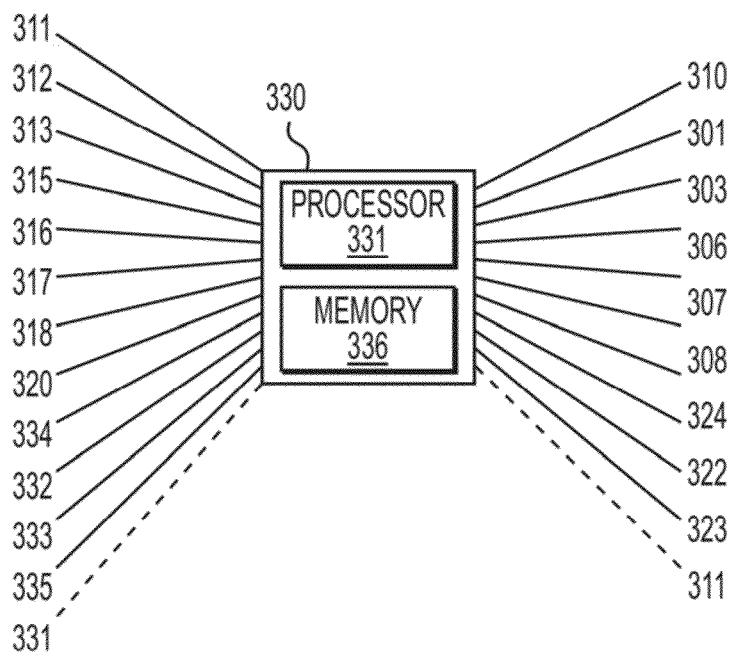
FIG. 3F is a schematic example showing sensor inputs to an electronic control unit and outputs to controlled devices.

Other sensors can include supercharger sensor 211 and 311, CVT sensor 216 and 316, pulley sensor 217 and 317, crankshaft sensor 218, engine sensor 213 and 313, intercooler sensor 212 and 312, exhaust sensor 215, transmission sensor 234 and 334, front axle sensors 232 and 332, rear axle sensors 233 and 333, and EGR throttle sensor 231 and 331. More or fewer sensors may be included as needed. FIGS. 2F and 3F schematically illustrate data collection by the sensors, central data processing, and command distribution to adjust vehicle devices. Computing devices 230 and 330 include processors 231 and 331 and memories 234 and 334 with appropriate algorithms stored and executed therein. Because exhaust gas recirculation (EGR) is optional, as below, the sensing and adjustment is shown in broken lines in FIGS. 2F and 3F. Since many sensors are capable of transceiving information, a sensor is illustrated as sending data for each device, and a command is shown being sent to the receiving device, it being understood that a control system device can be configured to sense conditions, send data, receive control signals and effect actuation of the control signal.

FIG. 2A illustrates an example of a relationship between a boosted state, belt 209 tension, and pressure measurements P1, P2, P3, and P4. Open throttle valve 210 receives air of approximate ambient pressure, for example P1=~100 kPa. Throttle valve 210 may optionally adjust the air pressure to atmospheric pressure. Supercharger 201 then receives positive drive power via CVT 206 to spin the rotors thereby intaking air of pressure P2=100 kPa and forcing it through the rotors and towards intercooler 202. Supercharger 201 creates a higher pressure airflow at P3, which can be P3=200 kPa, creating an effective pressure ratio of P3/P2=2.0.

CVT 206 is operating at a high transfer ratio to transfer a high amount of energy from engine 203 to supercharger 201. Belt 209, which traverses CVT pulley 207 and engine pulley 208, has a higher tension on an engine-pulling side than a tension on a supercharger-pulling side. As shown in the example, T1=400 N and T2=1000 N. That is, supercharger 201 draws torque power from engine 203 to create high pressure air at P3.

Air from intercooler 202 enters combustion chamber of engine 203, where it is used in the combustion process, and exits toward muffler 205. The exiting air is of pressure P4=~100 kPa plus pressure from exhaust restriction.

FIG. 2B illustrates an example having an engine throttle valve 210 upstream from supercharger 201. Engine throttle valve 210 is open. While no boosting from supercharger 201 is needed, CVT 206 controls the speed of supercharger 201 so that supercharger 201 provides all of the engine throttling function. Therefore, supercharger 201 operates with negative drive power. That is, CVT 206 is a conduit to provide torque energy back to a crank shaft of engine 203. CVT 206 operates with a low ratio, meaning the energy transfer from the crank shaft to the supercharger is lower than the energy transfer from the supercharger back to the crank shaft. Belt 209 assists with the energy transfer through its tensioning. As shown in FIG. 2B, belt 209 is tensioned across CVT pulley 207 and engine pulley 208. The supercharger-pulling side of belt 209 has a tension T1=700 N, which is greater than tension T2=400 N on engine-pulling side of belt 209. That is, supercharger 201 provides torque power to engine 203.

In the example of FIG. 2B, a pressure drop occurs across supercharger 201. For example, air enters the system at ambient pressure, for example P1=~100 kPa. Throttle valve 210 may optionally adjust the air pressure to atmospheric pressure. Air then enters supercharger 201 at P2=100 kPa and exits at P3=80 kPa, for an effective pressure ratio of P3/P2=0.8. The reduced pressure air is cooled in optional intercooler 202 and is provided to engine 203. After use in the combustion chamber, spent air enters optional muffler 205 at pressure P4=100 kPa plus additional pressure from exhaust restriction.

FIG. 2C illustrates an example having engine throttling function from both engine throttle valve 210 and supercharger 201. This combination creates a pressure drop at P2, and a second pressure drop at P3.

Engine throttle valve 210 is upstream from supercharger 201 and is partially closed. While no boosting from supercharger 201 is needed, CVT 206 controls the speed of supercharger 201 so that supercharger 201 provides a portion of the engine throttling function. The remainder of the throttling function is provided by throttle valve 210. A computer system having a processor and a memory with a stored control algorithm may assist with the extent of throttling provided by supercharger 201 and throttle valve 210.

Supercharger 201 operates with negative drive power. That is, CVT 206 is a conduit to provide torque energy back to a crank shaft of engine 203. CVT 206 operates with a low ratio, meaning the energy transfer from the crank shaft to the supercharger is lower than the energy transfer from the supercharger back to the crank shaft. Belt 209 is tensioned across CVT pulley 207 and engine pulley 208.

In the example shown, the supercharger-pulling side of belt 209 has a tension T1=600 N, which is greater than tension T2=400 N on engine-pulling side of belt 209. That is, supercharger 201 provides torque power to crank shaft of engine 203.

Also shown in the example, air enters the system at ambient pressure, or P1=~100 kPa. After being affected by throttle valve 210, air enters supercharger 201 at P2=80 kPa and exits at P3=65 kPa, for an effective pressure ratio of P3/P2=0.8. The reduced pressure air is cooled in optional intercooler 202 and is provided to engine 203. After use in the combustion chamber, spent air enters optional muffler 205 at pressure P4=100 kPa plus additional pressure from exhaust restriction.

FIG. 2D is an example having a throttle valve 210 upstream from supercharger 201. This example also includes an exhaust gas recirculation (EGR) valve 211. CVT 206 controls the speed of supercharger 201 so that supercharger 201 provides all of the necessary engine throttling for this example. Engine throttle valve 210 is upstream from supercharger 201 and is open. Supercharger 201 operates with negative drive power. That is, CVT 206 is a conduit to provide torque energy back to a crank shaft of engine 203. CVT 206 operates with a low ratio, meaning the energy transfer from the crank shaft to the supercharger is lower than the energy transfer from the supercharger back to the crank shaft. Belt 209 is tensioned across CVT pulley 207 and engine pulley 208. In this example, the supercharger-pulling side of belt 209 has a tension T1=700 N, which is greater than tension T2=400 N on engine-pulling side of belt 209. That is, supercharger 201 provides torque power to crank shaft of engine 203.

Air enters the system at ambient pressure P1=~100 kPa. Throttle valve 210 may optionally adjust the air pressure to atmospheric pressure. Air then enters supercharger 201 at P2=100 kPa and exits at P3=80 kPa, for an effective pressure ratio of P3/P2=0.8. The reduced pressure air is cooled in optional intercooler 202 and is provided to engine 203. After use in the combustion chamber, used air exits towards optional muffler 205 at pressure P4=100 kPa plus additional pressure from exhaust restriction. Some or all of the used air can either recirculate into the air stream entering engine 203 via exhaust gas recirculation (EGR) valve 211, or some or all of the used air can exit the system through the muffler 205.

The EGR valve is useful for conditions when it is beneficial for exhaust gas to enter the intake manifold of engine 203. Intake manifold interposes intercooler 202 and engine 203. Since air flows due to pressure differences, the lower pressure in the intake system encourages the air to flow from the nearly atmospheric pressure exhaust at P4 into the slightly below atmospheric pressure intake manifold.

FIG. 2E schematically shows the CVT 206 uncoupled from the crankshaft. In this configuration, the CVT comprises an independent torque supply, such as an electric motor, for connecting to the driveshaft of supercharger 201. The independent torque supply has additional connectivity to a power supply and control electronics.

FIGS. 3A-3E show examples where a throttle valve is downstream from a supercharger. FIG. 3A shows air at ambient pressure P5=~100 kPa entering supercharger 301. Supercharger 301 provides boosting, which increases the air pressure above atmospheric, and air exits at pressure P6, for example P6=200 kPa. In this example, the effective pressure ratio is P6/P5=2.0. The air then enters optional intercooler 302 and is supplied to open throttle valve 310. Air exiting throttle valve 310 is also at pressure P7=200 kPa, and is used in combustion engine 303. Used air exits engine 303 and enters optional muffler 304 at pressure P8=~100 kPa plus additional pressure from exhaust restriction.

CVT 306 is operating at a high transfer ratio to transfer a high amount of energy from crank shaft of engine 303 to a rotor drive shaft of supercharger 301. Belt 309, which traverses CVT pulley 307 and engine pulley 308, has a higher tension T4 on an engine-pulling side than a tension T3 on a supercharger-pulling side. For example, T4=1000 N and T3=400 N. That is, supercharger 301 draws torque power from engine 303 to create high pressure air at P6.

FIG. 3B shows an example of supercharger 301 providing engine throttling. The system does not require air boosting by supercharger 301, so CVT 306 controls the speed of supercharger 301 so that supercharger 301 provides all of the engine throttling function and so that the lobed rotors are slowed to create torque on the rotors. This torque is supplied, via the low transfer ratio on CVT 306, to crank shaft of engine 303. Belt 309 spans CVT pulley 307 and engine pulley 308. Tension T3 on a supercharger-pulling side of belt 309 is greater than tension T4 on engine-pulling side of belt 309. In other words, the drive power of the supercharger 301 is negative. In the example shown, T3=700 N and T4=400 N.

Air at ambient pressure P5=~100 kPa enters supercharger 301. Supercharger 301 has a negative pressure differential across it, and air exits at pressure P6=80 kPa, for an effective pressure ratio of P6/P5=0.8. The air then enters optional intercooler 302 and is supplied to open throttle valve 310. Air exiting throttle valve 310 is at pressure P7=80 kPa, and is used in combustion engine 303. Used air exits engine 303 and enters optional muffler 304 at pressure P8=~100 kPa plus additional pressure from exhaust restriction.

FIG. 3C illustrates an example of engine throttling by both supercharger 301 and throttle valve 310. Supercharger 301 does not provide all of the throttling function. Therefore, throttle valve 310 is partially closed to supply a portion of the throttling function for engine 303. A computer system having a processor and a memory with a stored control algorithm may assist with the extent of throttling provided by supercharger 301 and throttle valve 310.

The system does not require air boosting by supercharger 301, so CVT 306 controls the speed of supercharger 301 so that supercharger 301 provides a portion of the engine throttling function and so that the lobed rotors are slowed to create torque on the rotors. The torque from the rotors is supplied, via the low transfer ratio on CVT 306, to crank shaft of engine 303. Belt 309 spans CVT pulley 307 and engine pulley 308. In this example, tension T3=700 N on a supercharger-pulling side of belt 309 is greater than tension T4=400 N on engine-pulling side of belt 309. In other words, the drive power of the supercharger 301 is negative.

Air of pressure P5=~100 kPa enters supercharger 301. Supercharger 301 has a negative pressure differential across it, and air exits at pressure P6=80 kPa, for an effective pressure ratio of P6/P5=0.8. The air then enters optional intercooler 302 and is supplied to partially closed throttle valve 310. Air exiting throttle valve 310 is at pressure P7=65 kPa, and is used in combustion engine 303. Used air exits engine 303 and enters optional muffler 304 at a pressure P8=~100 kPa plus additional pressure from exhaust restriction.

FIG. 3D illustrates an example of a downstream throttle with exhaust gas recirculation (EGR) where supercharger 301 provides some or all of the throttling via speed control from CVT 306. Supercharger 301 operates with negative drive power. That is, CVT 306 is a conduit to provide torque energy back to a crank shaft of engine 303. CVT 306 operates with a low ratio, meaning the energy transfer from the crank shaft to the supercharger is lower than the energy transfer from the supercharger back to the crank shaft. Belt 309 is tensioned across CVT pulley 307 and engine pulley 308. In this example, the supercharger-pulling side of belt 309 has a tension T3=700 N, which is greater than tension T4=400 N on engine-pulling side of belt 309. That is, supercharger 301 provides torque power to crank shaft of engine 303.

Air enters supercharger 301 at pressure P5=~100 kPa. Air exits at P6=80 kPa, for an effective pressure ratio of P6/P5=0.8. The reduced pressure air is cooled in optional intercooler 302 and is provided to open throttle valve 310 which passes the air to engine 303. After use in the combustion chamber, used air exits towards optional muffler 304 at pressure P4=100 kPa plus additional pressure from exhaust restriction. The some or all of the used air can either recirculate into the air stream entering engine 303 via exhaust gas recirculation (EGR) valve 311, or some or all of the used air can exit the system through the muffler 304.

The EGR valve is useful for conditions when it is beneficial for exhaust gas to enter the intake manifold of engine 303. Intake manifold interposes intercooler 302 and engine 303. Since air flows due to pressure differences, the lower pressure in the intake system encourages the air to flow from the nearly atmospheric pressure exhaust at P4 into the slightly below atmospheric pressure intake manifold.

FIG. 3E schematically shows the CVT 306 uncoupled from the crankshaft. In this configuration, the CVT comprises an independent torque supply, such as an electric motor, for connecting to the driveshaft of supercharger 301. The independent torque supply has additional connectivity to a power supply and control electronics.

CVT 206, 301 allows for precise control of the rotor speed, and therefore, also allows for precise control of the volume of air mass supplied for combustion. Because of the precise air mass control, no bypass valve is needed in the examples of FIGS. 2A-3E. Eliminating the bypass valve results in power savings for the example systems.

Figure 6:
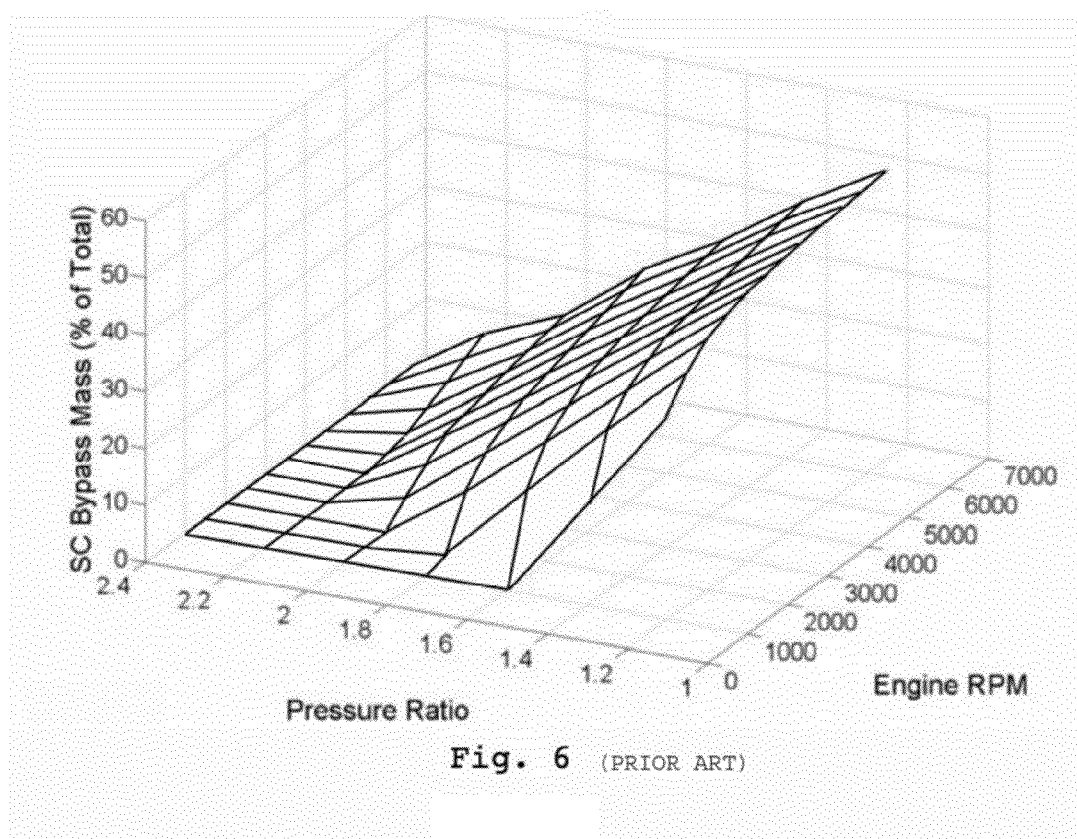
FIG. 6 is a graph showing an amount of air mass bypassed in the example of the prior art fixed pulley ratio supercharger arrangement.

FIG. 6 illustrates the percent of air mass bypassed in a prior art fixed pulley ratio 0.57 L supercharger with a 2 L engine. The prior art system is designed for optimal operation for only a portion of the operating range, which results in the intake of excess air mass for the remainder of the operating range. At low engine RPMs and high pressure ratio little or no air mass is bypassed. As the pressure ratio decreases and engine speed increases, the percentage of total air mass volume bypassed using the bypass valve increases. The bypassed air mass requires additional engine power to drive the prior art supercharger, as shown in FIG. 7.

When using a CVT drive instead of the fixed pulley ratio design, the supercharger spins faster at low engine speeds to increase boost, and spins slower at higher engine speeds to prevent overspeeding the supercharger. The engine power required for the CVT driven supercharger is shown in FIG. 8.

Figure 7:
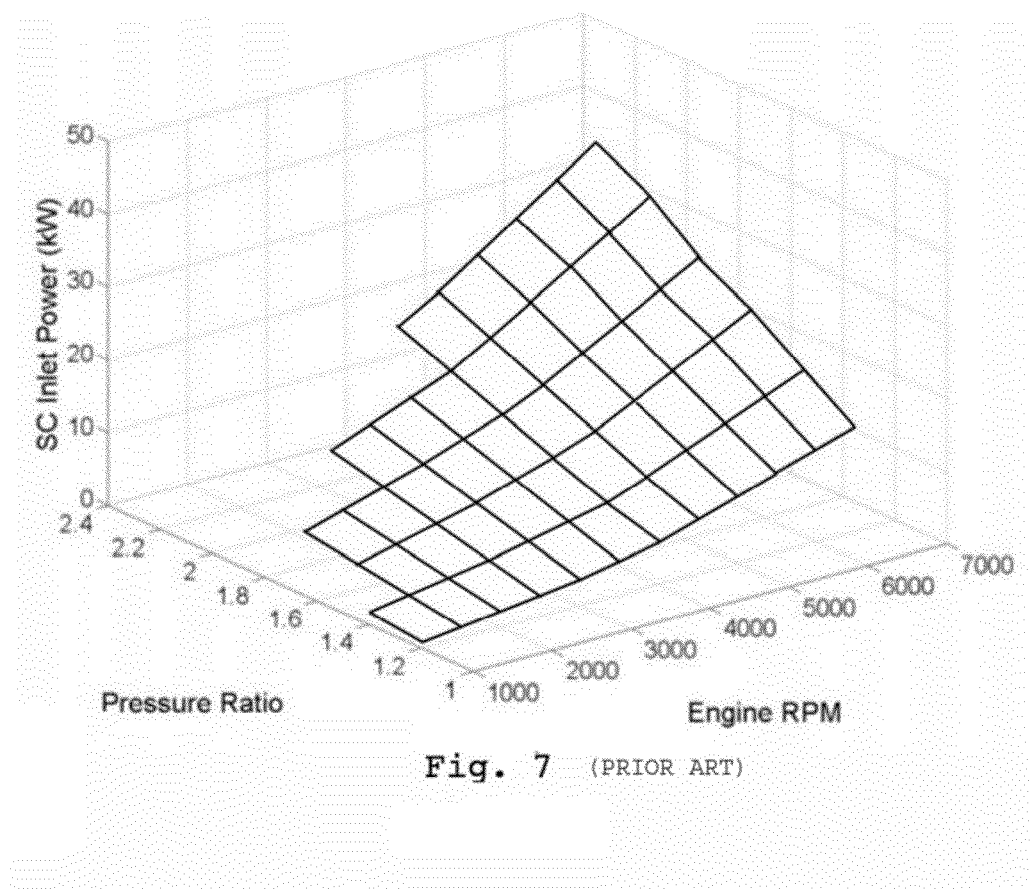
FIG. 7 is a graph of inlet power for the example of the prior art fixed pulley ratio supercharger arrangement.
Figure 8:
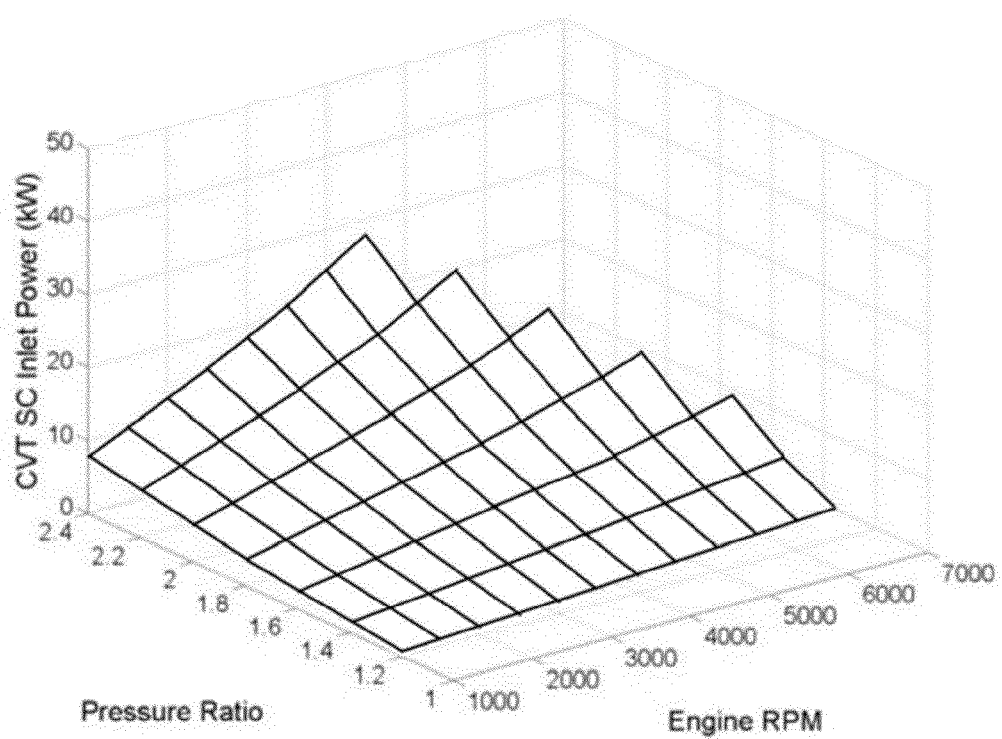
FIG. 8 is a graph of inlet power for the example of the CVT and supercharger arrangement.

Comparing FIGS. 7 and 8, the missing cells at the low engine speeds in FIG. 7 indicate that the prior art supercharger cannot provide a high pressure ratio for the air mass intake. However, the CVT driven supercharger of FIG. 8 can provide a high pressure ratio for the air mass intake over the entire engine operating range.

Figure 9:
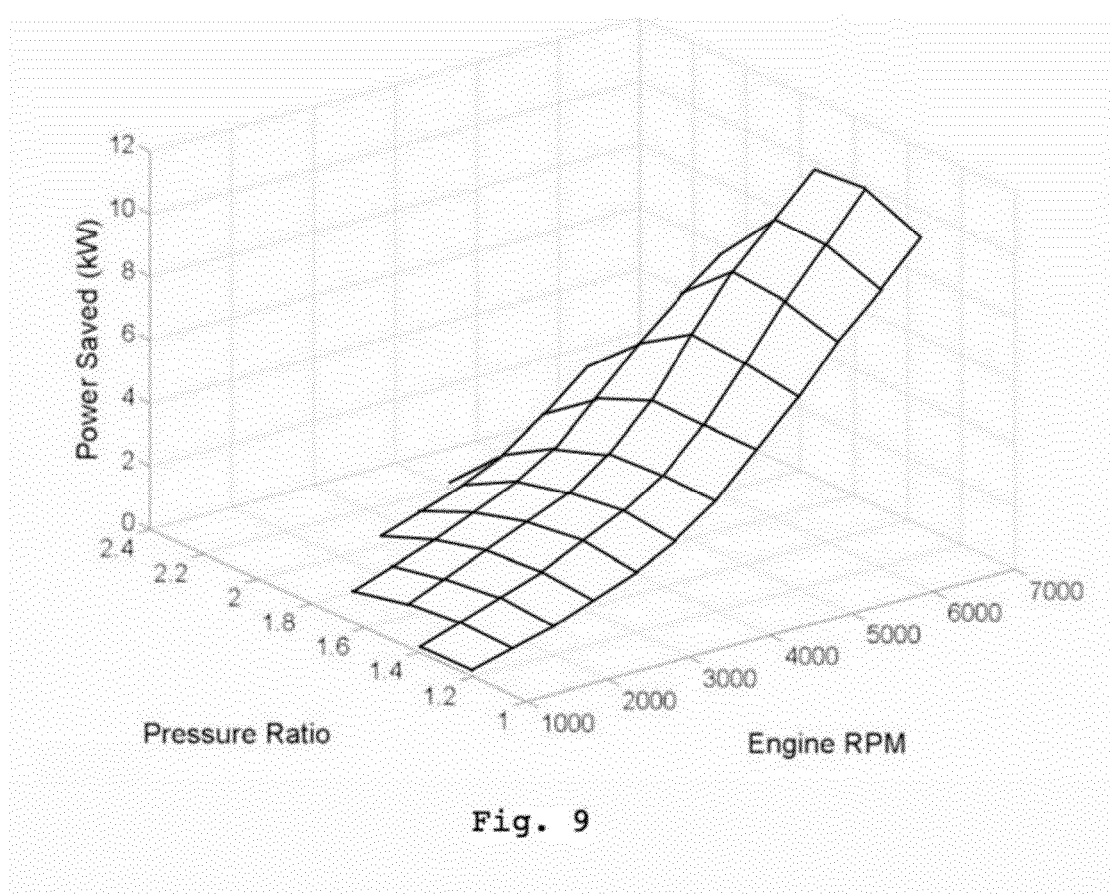
FIG. 9 is a graph of power savings for the example of the CVT and supercharger arrangement.

FIG. 9 illustrates the input power saved by operating the supercharger with a CVT drive instead of a fixed pulley ratio design. The input power savings with the CVT drive is approximately 3-5 kW at 4000-4500 engine RPMs and 1-1.5 kW at 2000-2500 RPMs under part load conditions. For a 2 L engine, the power savings translates in to an approximately 1-3% fuel economy gain at low to mid loads. The CVT driven supercharger enables the combined benefits of higher pressure ratios at low engine speeds (more "low end boost") and reduced supercharger input power.

As above, a benefit of adding a CVT between the combustion engine and the supercharger is the ability to use a smaller size supercharger. Ordinarily, supercharger size scales with engine displacement, so that as the engine displacement increases, the supercharger size also increases. However, with the CVT design, the supercharger size can be decreased compared to the prior art so that smaller superchargers are selected. As the size decreases, the supercharger may be run at faster peak limiting speeds. And, because the airflow can be tailored, and the supercharger is smaller, backwards leaking of air may avoided. The smaller size also impacts tolerances between the housing and the rotors, tolerances between the housing and the impeller, and tolerances between the rotor lobes as they mesh. That is, smaller superchargers can have smaller tolerances, thus improving air handling efficiencies.

As one example, the combustion engine may have a fluid displacement representing a volume of fluid, typically a mixture of fuel and air, that is displaced as pistons in the combustion chambers move through a half-cycle. That is, a piston may complete a cycle from top-dead center to bottom-dead center and back to top-dead center as the crank shaft turns. A half-cycle is the travel of a piston from top-dead center to bottom-dead center, or the travel of a piston from bottom-dead center to top-dead center. The displacement of the engine is represented by a size of the cylinder a piston moves in, the length of travel of a piston (from top to bottom, or from bottom to top, only), and the number of cylinders in the engine. The fuel may be gasoline or diesel depending upon application.

The supercharger may have a fluid displacement representing the volume of fluid, typically air, displaced as the rotors or impeller complete one revolution.

In the fixed pulley scenario, an engine system may use a pump with a displacement that is 0.7-0.3 of the engine displacement. However, when affiliated with a CVT, the pump displacement may be scaled down to 0.6-0.1 of the engine displacement. More preferably, in the CVT scenario, the pump displacement may be reduced to 20% of the displacement typically used in the fixed pulley scenario. The ability to use a smaller supercharger reduces space requirements and overall weight of the system, among other benefits.

As another example, a fixed pulley design may use a 2 Liter engine with a pump having a 1.3-0.7 Liter displacement, depending upon high or low performance selection. With a CVT, the same 2 Liter engine may be paired with a pump having a 0.9-0.4 Liter displacement, thus enabling high performance with a 30% smaller sized pump.

Several working examples will now be explained to elucidate the differences between a preset, fixed ratio torque output device in a combustion system and an electronically controlled, variable ratio CVT in a combustion system. The charts demonstrate that not only can the CVT system use a smaller supercharger, but also that the supercharger can be controlled to meet and exceed specific airflow demands for all engine speeds.

For each example, for calculation purposes, the volumetric efficiency of the supercharger is assumed to be 70% for point 1, 80% for point 2, and 90% for point 3.

EXAMPLE 1

The following engine parameters in Table 3 apply to a particular combustion system of Examples 1 and 2 having an engine displacement of 0.6 Liters:

TABLE 3

| Engine Parameters | Ideal Amount | Unit | Range High | Range Low |
|---|---|---|---|---|
| Engine Speed 1 | 1500 | l/min | 5400 | 900 |
| Engine Speed 2 | 4000 | l/min | 6000 | 3000 |
| Engine Speed 3 | 6000 | l/min | 10000 | 4000 |
| Required Airflow to Engine at Speed 1 | 1180 | L/min | 1800 | 360 |
| Required Airflow to Engine at Speed 2 | 3358 | L/min | 4800 | 960 |
| Required Airflow to Engine at Speed 3 | 3200 | L/min | 7200 | 1440 |

For this scenario, there are three points, corresponding to point 1, 2 and 3 on FIG. 1. An ideal crank shaft RPM is shown as an engine speed for each point, along with a range of speeds that the engine can operate within on either side of the ideal. So for the first point, indicating an acceleration event from idled to point 1 of FIG. 1, the ideal crank shaft RPM is an engine speed of 1500 RPMs. To be within range of this point 1, the crank shaft can vary from 5400 RPMs to 900 RPMs. An ideal amount of airflow to the engine at ideal engine speed 1 is 1180 Liters per minute, though the airflow range can vary from 1800 Liters per minute to 360 Liters per minute as the crank shaft RPMs move within range high and range low. Engine speed 2 has an ideal 4000 RPMs at point 2 of FIG. 1 with ideal airflow of 3359 Liters per minute. The engine RPMs can range from 6000 to 3000, and the airflow can range from 4800 to 960 Liters per minute. Point 3 traditionally indicates a cut-off point, beyond which either the engine or the supercharger will reach its operational limit. Exceeding the operation limits causes system break down, and so traditional fixed ratio designs do not allow operation past point 3. For the above example, the ideal engine speed is 6000 RPMs, and the maximum rated engine speed is 10000 RPMs. The ideal airflow at point 3 is 3200 Liters per minute, with a range of 7200 to 1440 Liters per minute.

Fixed Ratio Results:

In the fixed ratio torque transfer scenario, a 0.18 Liter displacement supercharger has a maximum drive shaft speed of 35000 RPMS. The supercharger displacement is 30% of the engine displacement. A fixed ratio torque transfer device is set to 5.8:1 so that the system can meet point 2 of FIG. 1. Thus, for every one turn of the crank shaft, the supercharger drive shaft turns 5.8 times. This design allows the system to meet the requirements at points 1, 2, and 3. However, the engine can run up to 10000 RPMs, but its activity is capped at 6000 RPM to prevent overspeeding the supercharger. The engine capacity is wasted. In addition, the supercharger cannot meet the range high 7200 Liters per minute airflow without overspeeding. Thus, the fixed ratio design cannot operate along the full operational ranges of both the engine and the supercharger.

TABLE 4

| SC Airflow at Engine Point 1 | 1180.575 | L/min |
| SC Airflow at Engine Point 2 | 3358.08 | L/min |
| SC Airflow at Engine Point 3 | 5666.76 | L/min |
| Excess Airflow at Engine Point 1 | 0.575 | L/min |
| Excess Airflow at Engine Point 2 | 0.08 | L/min |
| Excess Airflow at Engine Point 3 | 2466.76 | L/min |

Table 4 shows that for crank shaft RPMs below point 2, there is excess airflow present, which must be diverted away from the engine to avoid oversupply. A small overage is also possible at point 2. Between points 2 and 3, there is a very large oversupply of airflow to the engine, resulting in wasted energy as the large volume of air is diverted, bypassed, or waste-gated out of the system. Because the supercharger is linked to the crank shaft to spin at increasing speeds as the engine speed increases, the added burden to the engine to spin the supercharger is an energy loss to the system.

Variable Ratio CVT Results:

A significantly smaller supercharger can be selected to meet the airflow demands of points 1, 2, and 3 when coupled to an electronically controlled CVT. For this example, a 0.072 Liter displacement supercharger with a maximum drive shaft speed of 60000 RPMs is selected. The supercharger displacement (size) is 12% of the engine displacement. Because the torque transfer parameters are also now variable, the below chart shows the drive shaft to crank shaft ratios available to the CVT.

TABLE 5

| | |
|---|---|
| Max Ratio possible - Point 1 | 40.0:1 |
| Max Ratio possible - Point 2 | 15.0:1 |
| Max Ratio possible - Point 3 | 10.0:1 |
| Max Airflow Possible - Point 1 | 3240 L/min |
| Max Airflow Possible - Point 2 | 36000 L/min |
| Max Airflow Possible - Point 3 | 43200 L/min |
| Ratio to meet Airflow Target at Point 1 | 14.6:1 |
| Ratio to meet Airflow Target at Point 2 | 14.6:1 |
| Ratio to meet Airflow Target at Point 3 | 8.2:1 |

As shown in Table 5, the CVT offers a range of drive shaft to crank shaft ratios, with a 40.0:1 ratio available at point 1, a 15.0:1 ratio at point 2, and a 10.0:1 ratio at point 3. While the CVT system is capable of exceeding airflow demands at each point 1, 2, and 3, the size and speed selected cannot meet the engine range high airflow requirement around point 3. However, by operating the CVT at selected ratios, the airflow is tailored to supply only that required to meet the ideal amount at points 1, 2, and 3. So, by operating the CVT at a 14.6:1 ratio, the supercharger supplies the exact airflow required for points 1 and 2, while a 8.2:1 ratio supplies the ideal airflow at point 3. Should operating conditions vary from the ideal conditions, the airflow requirement can be adjusted to meet the demands of the non-ideal condition and a new CVT ratio can be selected for the non-ideal condition. In addition, the variable ratio CVT design is able to operate without overspeeding the supercharger. Thus, the variable ratio CVT in a combustion system enables the engine to work along its entire operational range, up to its peak limiting speed, and also enables the supercharger to work along its entire operational range, up to its peak limiting speed. Thus, there is no wasted capacity. And, by matching the CVT ratio precisely to the operating conditions, bypass and wastegate use is eliminated and the crank shaft energy is not wasted on excess airflow production.

EXAMPLE 2

Example 2 uses the same engine as the first example, but combines the engine with a different supercharger of 0.45 Liter displacement and having a maximum drive shaft speed of 24000 RPMs. The supercharger displacement is 75% of the engine displacement.

Fixed Ratio Results

The torque transfer device is set to a 3.6:1 ratio of driveshaft to crank shaft RPMs.

TABLE 6

| | |
|---|---|
| SC Airflow at Engine Point 1 | 1822.5 L/min |
| SC Airflow at Engine Point 2 | 5184 L/min |
| SC Airflow at Engine Point 3 | 8748 L/min |
| Excess Airflow at Engine Point 1 | 22.5 L/min |
| Excess Airflow at Engine Point 2 | 384.0 L/min |
| Excess Airflow at Engine Point 3 | 4748.0 L/min |

At each point 1, 2, and 3, the supercharger oversupplies airflow to the engine and drains energy from the system. Excess airflow must be bypassed or waste-gated to avoid oversupply to the engine. Even though the supercharger can meet the airflow requirements at points 1, 2 and 3, the engine cannot operate along its full operational range, as this would overspeed the supercharger. Thus, the 10000 RPM crank shaft capacity is wasted, and the crank shaft speed must be limited to below 6,600 RPMs.

Variable Ratio CVT Results

An electronically computer controlled CVT is used with a range of possible ratios up to 9.3:1 RPMs of the drive shaft to the crank shaft. The supercharger size is the same as above, 0.45 Liters per minute displacement with a maximum drive shaft speed of 24000 RPMs.

TABLE 7

| | |
|---|---|
| Max Ratio possible - Point 1 | 9.3:1 |
| Max Ratio possible - Point 2 | 3.5:1 |
| Max Ratio possible - Point 3 | 2.3:1 |
| Max Airflow Possible - Point 1 | 4725 L/min |
| Max Airflow Possible - Point 2 | 8400 L/min |
| Max Airflow Possible - Point 3 | 10080 L/min |
| Ratio to meet Airflow Target at Point 1 | 3.6:1 |
| Ratio to meet Airflow Target at Point 2 | 3.3:1 |
| Ratio to meet Airflow Target at Point 3 | 1.6:1 |

Table 7 shows that the CVT driven supercharger can meet each airflow requirement for the engine, including the range high maximum airflow for the engine operating at 10000 RPMs. Thus, the variable ratio CVT enables the engine to operate along its entire operating range while the supercharger operates along is entire operating range. Instead of limiting the engine RPMs, the transmission ratio can be adjusted to avoid overspeeding the supercharger when the engine speed exceeds 6000 RPMs. For example, the ratio can adjust from 1.6:1 to about 1.7:1. Thus, the engine capacity is not wasted, nor is the crank shaft energy wasted, and there is no oversupply or undersupply of airflow. Peak torque output is easily achieved as the actual torque output when the engine is operating in a range of 15%-90% of the engine maximum rotations per minute.

EXAMPLE 3

A larger engine of 15 Liters is used in a combustion system of examples 3 and 4, the engine having a maximum crank shaft RPM of 10000.

TABLE 8

| Engine Parameters | Ideal Amount | Unit | Range High | Range Low |
|---|---|---|---|---|
| Engine Speed 1 | 1500 | l/min | 5400 | 900 |
| Engine Speed 2 | 4000 | l/min | 6000 | 3000 |
| Engine Speed 3 | 6000 | l/min | 10000 | 4000 |
| Required Airflow to Engine at Speed 1 | 26000 | L/min | 45000 | 9000 |
| Required Airflow to Engine at Speed 2 | 83000 | L/min | 120000 | 24000 |
| Required Airflow to Engine at Speed 3 | 75000 | L/min | 180000 | 36000 |

Fixed Ratio Results

A 4.5 Liter displacement supercharger is paired with a fixed ratio torque transfer device with a ratio of 5.83 turns of the drive shaft for every one turn of the crank shaft. The supercharger has a maximum drive shaft speed of 35000 RPMs. The displacement is selected in order to meet the requirements at points 1 and 2, but the supercharger size and RPMs cannot meet the range high for the engine for point 3. The supercharger displacement is 30% of the engine displacement.

TABLE 9

| | |
|---|---|
| SC Airflow at Engine Point 1 | 27560.925 L/min |
| SC Airflow at Engine Point 2 | 83995.2 L/min |
| SC Airflow at Engine Point 3 | 141741.9 L/min |
| Excess Airflow at Engine Point 1 | 1560.9 L/min |
| Excess Airflow at Engine Point 2 | 995.2 L/min |
| Excess Airflow at Engine Point 3 | 66741.9 L/min |

Table 9 shows a very large energy waste at point 3. At each point 1, 2, and 3, the fixed ratio design can meet the airflow requirements, but with a waste of crank shaft torque transfer. In addition, despite the large overage of airflow at point 3, the engine cannot safely operate past point 3, as this would overspeed the supercharger. Thus, the supercharger cannot supply airflow beyond the crank shaft speed of 6000 RPMs without incurring damage. The engine displacement capacity and torque transfer to the drive shaft is again wasted.

Variable Ratio CVT Results

Using a variable ratio CVT enables the use of a smaller supercharger having a displacement of 1.8 Liters with the 15 Liter engine. The 1.8 Liter supercharger has a maximum drive shaft speed of 60000 RPMs. Because of its small size, the supercharger cannot meet the range high airflow requirements for points 2 and 3. The supercharger displacement is 12% of the engine displacement.

TABLE 10

| | |
|---|---|
| Max Ratio possible - Point 1 | 40.0:1 |
| Max Ratio possible - Point 2 | 15.0:1 |
| Max Ratio possible - Point 3 | 10.0:1 |
| Max Airflow Possible - Point 1 | 75600 L/min |
| Max Airflow Possible - Point 2 | 33600 L/min |
| Max Airflow Possible - Point 3 | 43200 L/min |
| Ratio to meet Airflow Target at Point 1 | 13.8:1 |
| Ratio to meet Airflow Target at Point 2 | 14.4:1 |
| Ratio to meet Airflow Target at Point 3 | 7.7:1 |

The variable ratio CVT design has flexibility to meet each engine airflow requirement for points 1, 2, and 3. Table 10 shows that, while a 40.0:1 drive shaft to crank shaft ratio is available at point 1, a ratio of 13.8 to 1 precisely meets the airflow requirements at point 1. Likewise, airflow requirements for points 2 and 3 are met without overspeeding the supercharger and without wasting torque transferred from the crank shaft. While an undersupply of airflow may occur in range high engine operation, the engine can be used along its entire operation range and the supercharger can be used along its entire operation range.

EXAMPLE 4

Example 4 uses the 15 Liter engine, above, with a larger displacement supercharger of 11.25 Liters with a maximum drive shaft RPM of 24000.

Fixed Ratio Results:

While the size and speed of the supercharger is capable of meeting the range high airflow requirements, using a fixed ratio device set at 3.4:1 prevents the supercharger from operating along the entire engine operating range. Engine capacity is wasted to prevent overspeeding the supercharger.

TABLE 11

| | |
|---|---|
| SC Airflow at Engine Point 1 | 40162.5 L/min |
| SC Airflow at Engine Point 2 | 122400 L/min |
| SC Airflow at Engine Point 3 | 206550 L/min |
| Excess Airflow at Engine Point 1 | 20162.5 L/min |

TABLE 11-continued

| | |
|---|---|
| Excess Airflow at Engine Point 2 | 2400 L/min |
| Excess Airflow at Engine Point 3 | 96550 L/min |

Table 11 also shows a large airflow waste at each point 1, 2, and 3. The crank shaft energy necessary to create the airflow must be wasted via bypass, diversion or wastegate.

Variable Ratio CVT Results:

The size and speed of the supercharger is capable of meeting the range high airflow requirements, and peak torque output is easily achieved as the actual torque output when the engine is operating in a range of 15%-90% of the engine maximum rotations per minute. The supercharger displacement (size) is 75% of the engine displacement.

TABLE 12

| | |
|---|---|
| Max Ratio possible - Point 1 | 9.3:1 |
| Max Ratio possible - Point 2 | 3.5:1 |
| Max Ratio possible - Point 3 | 2.3:1 |
| Max Airflow Possible - Point 1 | 110250 L/min |
| Max Airflow Possible - Point 2 | 7840 L/min |
| Max Airflow Possible - Point 3 | 10080 L/min |
| Ratio to meet Airflow Target at Point 1 | 1.7:1 |
| Ratio to meet Airflow Target at Point 2 | 3.3:1 |
| Ratio to meet Airflow Target at Point 3 | 1.8:1 |

Table 12 illustrates that the variable ratio CVT has a wide range of operational conditions to meet the airflow requirements of the engine. The engine can operate along its entire operational range, and the supercharger can operate along its full operational range. By adjusting the torque transfer of the CVT, the airflow requirements are met without oversupply and without undersupply.

EXAMPLE 5

The final example uses an engine with a displacement of 2 Liters.

TABLE 13

| Engine Parameters | Ideal Amount | Unit | Range High | Range Low |
|---|---|---|---|---|
| Engine Speed 1 | 1500 | l/min | 5400 | 900 |
| Engine Speed 2 | 4000 | l/min | 6000 | 3000 |
| Engine Speed 3 | 6000 | l/min | 10000 | 4000 |
| Required Airflow to Engine at Speed 1 | 3000 | L/min | 6000 | 4000 |
| Required Airflow to Engine at Speed 2 | 8200 | L/min | 16000 | 3200 |
| Required Airflow to Engine at Speed 3 | 8000 | L/min | 24000 | 4800 |

Fixed Ratio Results

A 0.9 Liter supercharger with a maximum drive shaft speed of 18000 RPMs is selected. The supercharger displacement is 45% of the engine displacement. A fixed ratio device is set to turn the drive shaft 2.9 times for every one turn of the engine crank shaft.

TABLE 14

| | |
|---|---|
| SC Airflow at Engine Point 1 | 2740.5 L/min |
| SC Airflow at Engine Point 2 | 8352 L/min |
| SC Airflow at Engine Point 3 | 14094 L/min |

TABLE 14-continued

| | |
|---|---|
| Discrepancy in Airflow at Engine Point 1 | −259.5 L/min |
| Discrepancy in Airflow at Engine Point 2 | 152 L/min |
| Discrepancy in Airflow at Engine Point 3 | 6094 L/min |

Table 14 shows that the design is not capable of supplying ideal airflow to the engine at point 1. The undersupply does not allow the engine to output peak torque at point 1, resulting in the actual torque output not equaling peak, or ideal, torque output. At points 2 and 3, an oversupply of airflow indicates a waste of torque energy to the supercharger. In addition, the engine must be limited to avoid overspeeding the supercharger, so its operational range is restricted and engine capacity is wasted.

Variable Ratio CVT Results:

A smaller, 0.52 Liter, supercharger is paired with the 2 Liter engine, resulting in the supercharger displacement being 26% of engine displacement. The maximum drive shaft speed is 20000 RPMs. Because of its small size, the supercharger cannot meet the range high airflow requirements for points 2 and 3, but the supercharger can meet the ideal, or peak torque output, requirements at points 1, 2, and 3 without wasting torque energy to the drive shaft.

TABLE 15

| | |
|---|---|
| Max Ratio possible - Point 1 | 13.3:1 |
| Max Ratio possible - Point 2 | 5.0:1 |
| Max Ratio possible - Point 3 | 3.3:1 |
| Max Airflow Possible - Point 1 | 7280 L/min |
| Max Airflow Possible - Point 2 | 11200 L/min |
| Max Airflow Possible - Point 3 | 14400 L/min |
| Ratio to meet Airflow Target at Point 1 | 5.5:1 |
| Ratio to meet Airflow Target at Point 2 | 4.9:1 |
| Ratio to meet Airflow Target at Point 3 | 2.8:1 |

Table 15 shows that a smaller supercharger can be used with a variable ratio CVT to meet peak torque output requirements for an engine. Because a range of torque transfer ratios are available for use, the system can adjust the airflow towards and away from the ideal airflow based on the operating conditions. As the operating conditions deviate from the ideal conditions, the CVT can be adjusted to supply airflow to the engine along the entire engine operating range, while utilizing the supercharger along its entire operating range.

In the preceding specification, various preferred embodiments have been described with reference to the accompanying drawings. It will, however, be evident that various other modifications and changes may be made thereto, and additional embodiments may be implemented, without departing from the broader scope of the invention as set forth in the claims that follow. For example, other pressure values P1-P8 may be implemented to achieve other operating conditions. Also, belt tensions T1-T4 may be adjusted. The specification and drawings are accordingly to be regarded in an illustrative rather than restrictive sense.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

We claim:

1. A combustion system comprising:
a control system comprising a processor, a memory, an algorithm stored in the memory, and control electronics;
a supercharger comprising an air inlet, an air outlet, and a drive shaft, the supercharger configured to move air from the air inlet to the air outlet, the supercharger having an operating range from an idled condition up to a maximum rotations per minute (RPM) of the drive shaft;
an engine comprising combustion chambers configured to receive air from the outlet of the supercharger, the engine further comprising an associated crank shaft, the engine having an engine operating range from an idled condition up to a maximum RPM of the crank shaft, the engine having at least one airflow demand for each RPM in the engine operating range for providing peak torque output; and
a continuously variable transmission (CVT) connected to the control system and further connected to the drive shaft for transmitting a variable amount of rotational energy to operate the supercharger,
wherein the control system controls the transmitting of the CVT based on the at least one airflow demand for each RPM in the engine operating range such that the supercharger variably pumps air across the operating range as the engine operates across the engine operating range.

2. The combustion system of claim 1, wherein, at any given RPM of the crank shaft, the control system controls the transmitting of the CVT to operate the supercharger at its maximum RPM.

3. The combustion system of claim 1, wherein the supercharger is a centrifugal supercharger comprising an impeller, and wherein the impeller is operatively coupled to the drive shaft.

4. The combustion system of claim 1, wherein the supercharger is a positive displacement pump comprising rotors, and wherein the drive shaft is operatively coupled to the rotors.

5. The combustion system of claim 1, wherein the supercharger is sized to displace a volume of air ($V_S$), wherein the engine is sized to displace a volume of fluid ($V_E$), and wherein $V_S$ is in the range of 60%-10% of $V_E$.

6. The combustion system of claim 5, wherein $V_S$ is in the range 0.06 Liters to 4.8 Liters, and $V_E$ is in the range 0.6 Liters to 8 Liters.

7. The combustion system of claim 5, wherein $V_S$ is in the range 0.8 Liters to 9.6 Liters, and $V_E$ is in the range 8.0 Liters to 16 Liters.

8. The combustion system of claim 1, wherein the supercharger is sized to displace a volume of air ($V_S$), wherein the engine is sized to displace a volume of fluid ($V_E$), and wherein $V_S$ is in the range of 25%-10% of $V_E$.

9. The combustion system of claim 1, wherein, for a sensed operating condition, the control system comprises a calculated peak torque output for the engine and a sensed actual torque output for the engine, and wherein the control system controls the transmitting of the CVT to operate the supercharger to boost the engine to achieve the calculated peak torque output as the actual torque output.

10. The combustion system of claim 9, wherein the engine achieves the calculated peak torque output as the actual torque output when the engine is operating in a range of 15%-90% of the engine maximum rotations per minute.

11. The combustion system of claim 1, wherein the control system controls the transmitting of the CVT such that no bypass valve is needed.

12. The combustion system of claim 1, wherein the control system controls the transmitting of the CVT to operate the supercharger such that each of the at least one airflow demands of each engine operating range RPM is met using air moved by the supercharger without an oversupply or undersupply of air to the combustion chambers.

13. The combustion system of claim 1, wherein the control system controls the transmitting of the CVT based on the at least one airflow demand for each RPM of the engine operating range such that the supercharger variably pumps air across the entire operating range as the engine operates across the entire engine operating range.

14. The combustion system of claim 1, wherein, when the combustion system is operating at a first RPM in the engine operating range, the control system receives operating condition inputs to calculate the at least one airflow demand, and wherein the control system controls the transmitting of the CVT such that the supercharger satisfies the at least one airflow demand.

15. The combustion system of claim 14, wherein the at least one airflow demand varies for each RPM in the engine operating range based on the operating condition inputs such that, as the operating condition inputs vary, the at least one airflow demand varies.

16. The combustion system of claim 1, wherein, when the combustion system is operating at a first RPM in the engine operating range, the control system receives operating condition inputs to calculate the at least one airflow demand, wherein, as the operating condition inputs vary, the at least one airflow demand for the first RPM in the engine operating range varies, and wherein the control system controls the transmitting of the CVT such that the supercharger satisfies the at least one airflow demand.

17. A combustion system comprising:
a control system comprising a processor, a memory, an algorithm stored in the memory, and control electronics;
a supercharger comprising an air inlet, an air outlet, and a drive shaft, the supercharger configured to move air from the air inlet to the air outlet, the supercharger having an operating range from an idled condition up to a maximum rotations per minute (RPM) of the drive shaft;
an engine comprising combustion chambers configured to receive air from the outlet of the supercharger, the engine further comprising an associated crank shaft, the engine having an engine operating range from an idled condition up to a maximum RPM of the crank shaft, the engine having a plurality of airflow demands for each RPM in the engine operating range for providing peak torque output; and
a continuously variable transmission (CVT) connected to the control system and further connected to the drive shaft for transmitting a variable amount of rotational energy to the supercharger,
wherein, for a selected drive shaft RPM, the control system selects one of the plurality of airflow demands based on received operating conditions and controls the transmitting of the CVT to provide rotational energy to the supercharger to move a quantity of air meeting the selected one of the plurality of airflow demands.

18. A computer program product comprising a tangible storage medium and a program stored on the storage medium, the program, when executed by a processor connected to a vehicle control system, for performing a method comprising:
receiving sensor data indicating operating conditions of a vehicle;
receiving engine data indicating a rotations per minute (RPM) of a crank shaft of an engine of the vehicle;
processing the received sensor data and the received engine data to determine a control signal for controlling a continuously variable transmission (CVT) of the vehicle;
transmitting the control signal to the CVT, the CVT connected to a drive shaft of a supercharger, the supercharger connected to move air to the engine such that the moved air equals engine airflow demand for outputting peak torque in response to the operating conditions; and
adjusting the transmitted control signal as the received sensor data varies such that a crank shaft RPM corresponds to a plurality of different control signals to satisfy airflow demands based on variations in the operating conditions.

19. The computer program product of claim 18, wherein the CVT is connected between the crank shaft of the engine and the drive shaft of the supercharger, and wherein the method further comprises, transferring, based on the rotations per minute of the crank shaft, rotational energy from the crank shaft to the drive shaft.

20. The computer program product of claim 18, wherein the method further comprises adjusting the control signal to avoid the use of a bypass valve.

21. The computer program product of claim 18, wherein the method further comprises adjusting the transmitted control signal to operate the supercharger across an operating range from an idled condition up to a maximum RPM of the drive shaft while the engine operates across an engine operating range from an idled condition up to a maximum RPM of the crank shaft.

\* \* \* \* \*